United States Patent
Mizumori

(10) Patent No.: US 12,142,951 B2
(45) Date of Patent: Nov. 12, 2024

(54) POWER TRANSMISSION APPARATUS, CONTROL METHOD FOR POWER TRANSMISSION APPARATUS, AND STORAGE MEDIUM

(71) Applicant: CANON KABUSHIKI KAISHA, Tokyo (JP)

(72) Inventor: Ryuta Mizumori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 18/162,402

(22) Filed: Jan. 31, 2023

(65) Prior Publication Data

US 2023/0246491 A1 Aug. 3, 2023

(30) Foreign Application Priority Data

Feb. 1, 2022 (JP) .................. 2022-014181

(51) Int. Cl.
H02J 50/80 (2016.01)
(52) U.S. Cl.
CPC .................... H02J 50/80 (2016.02)
(58) Field of Classification Search
CPC ....................................... H02J 50/80
See application file for complete search history.

(56) References Cited

U.S. PATENT DOCUMENTS

2016/0141886 A1* 5/2016 Eguchi ............... H02J 50/12
307/104

FOREIGN PATENT DOCUMENTS

JP 2015027172 A 2/2015
JP 2017070074 A 4/2017

* cited by examiner

*Primary Examiner* — Metasebia T Retebo
(74) *Attorney, Agent, or Firm* — Canon U.S.A., Inc. IP Division

(57) ABSTRACT

A power transmission apparatus that wirelessly transmits electric power to a power reception apparatus includes a detection unit configured to detect whether an object different from the power transmission apparatus and the power reception apparatus exists, a communication unit configured to perform a communication with the power reception apparatus of information used for performing detection by the detection unit, and a request unit configured to make a request to the power reception apparatus for continuing the communication of information in a case where ending of the communication of information is requested from the power reception apparatus before the communication of information used for performing detection by the detection unit ends.

13 Claims, 15 Drawing Sheets

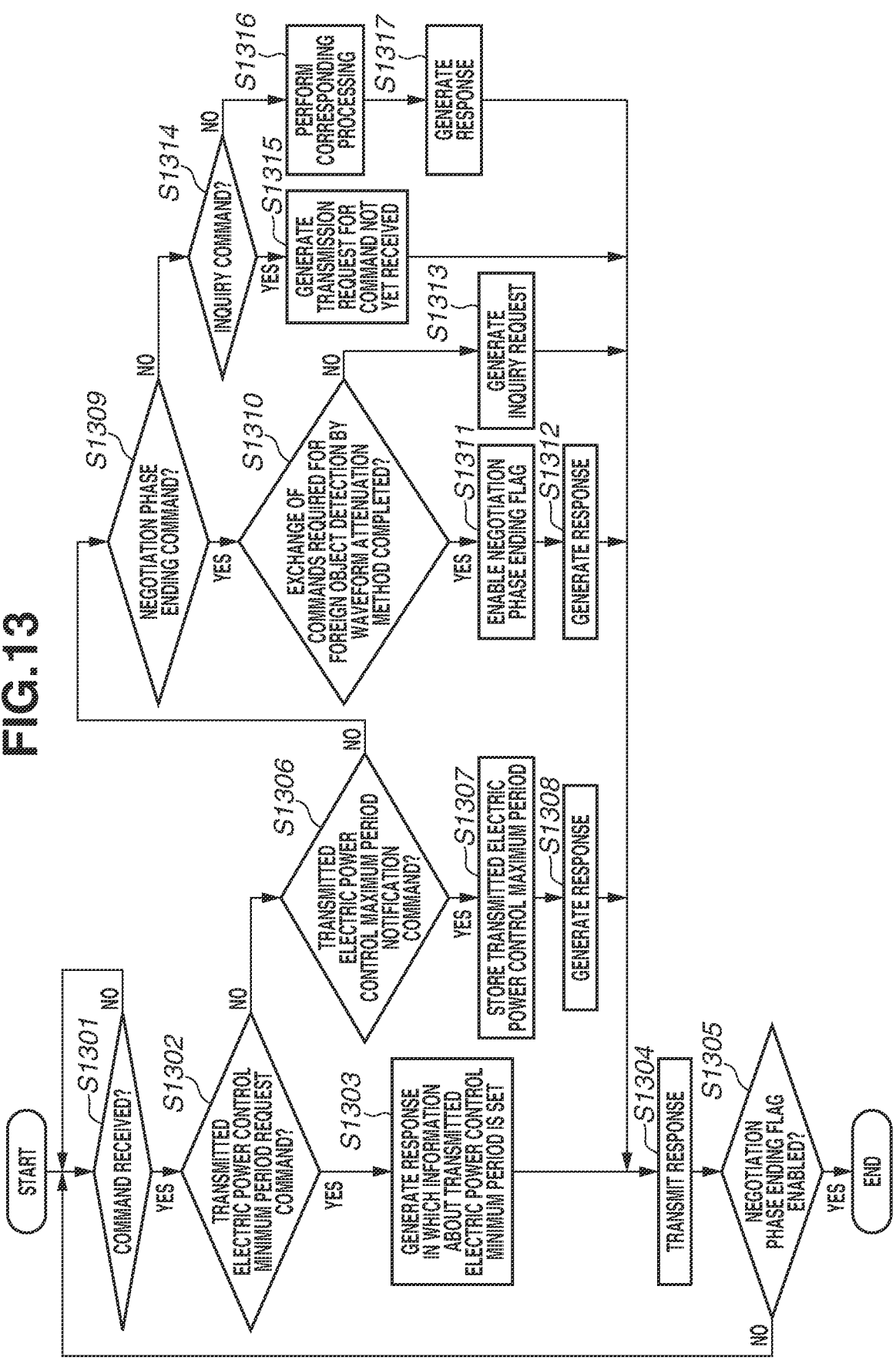

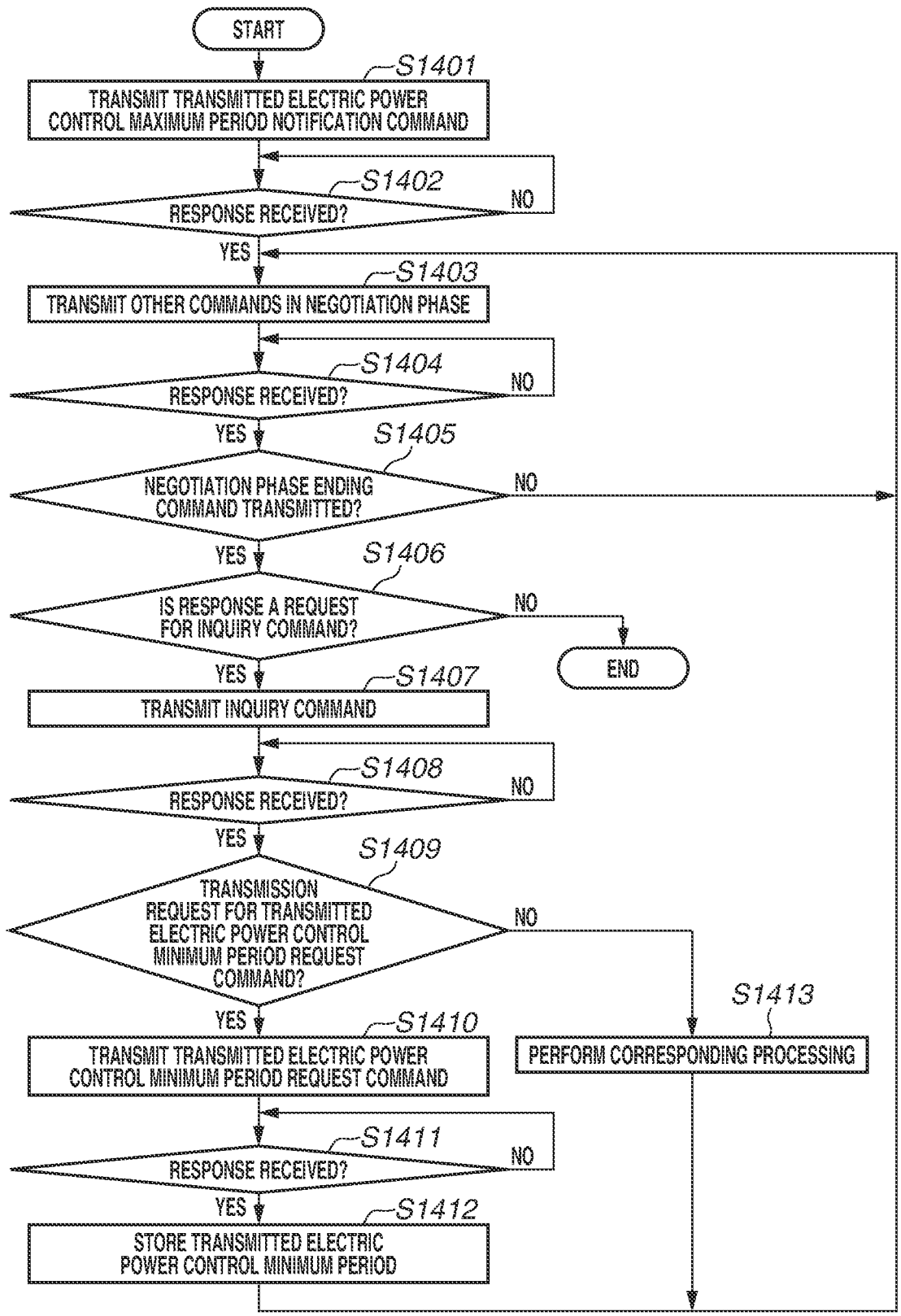

POWER TRANSMISSION APPARATUS, CONTROL METHOD FOR POWER TRANSMISSION APPARATUS, AND STORAGE MEDIUM

BACKGROUND

Field

Aspects of the present disclosure generally relate to a power transmission apparatus, a control method for a power transmission apparatus, and a storage medium.

Description of the Related Art

In recent years, there have been widespread advancements in technological developments for wireless electric power transmission systems. In wireless electric power transmission systems, in a case where an object (hereinafter referred to as a "foreign object") which differs from a power transmission apparatus and a power reception apparatus exists within a range in which the power transmission apparatus is able to transmit electric power, it becomes important to detect the foreign object to control electric power transmission and reception.

Japanese Patent Application Laid-Open No. 2017-70074 discusses a method of, in a case where a foreign object exists near power transmission and reception apparatuses which are compliant with the Wireless Power Consortium (WPC) standard, detecting the foreign object to limit electric power transmission and reception.

Moreover, as another foreign object detection method, Japanese Patent Application Laid-Open No. 2015-27172 discusses a foreign object detection method for detecting the existence of an object based on a change of energy attenuation or a change of resonance frequency of a power transmission coil and a resonant circuit integrated with or coupled to the power transmission coil. In this method, a power transmission apparatus is configured to transmit a signal for foreign object detection to a power reception apparatus and then determine the presence or absence of a foreign object by using an echo signal received from the power reception apparatus.

In the case of performing foreign object detection using a change of attenuation of energy waveforms such as that discussed in Japanese Patent Application Laid-Open No. 2015-27172, it is required that waveform attenuation does not cause a problem to either the power transmission apparatus or the power reception apparatus. In light of this factor, it is conceivable that, at the time of implementing foreign object detection by using this method in the WPC standard, both the power transmission apparatus and the power reception apparatus exchange information with respect to respective response capabilities for an attenuation time in a Negotiation phase. However, even a power reception apparatus compliant with the WPC standard is able to request ending of the Negotiation phase in a situation where the information exchange required for performing foreign object detection using this method is not yet entirely completed. If the Negotiation phase ends in a situation where such information exchange has been interrupted, a request for foreign object detection may be made even when foreign object detection is impossible or a request for foreign object detection may not be made even when foreign object detection is possible, so that inefficiencies or inconvenience to a user may occur.

SUMMARY

Various embodiments of the present disclosure are generally directed to appropriately performing detection of an object which differs from a power reception apparatus and a power transmission apparatus.

According to one embodiment of the present disclosure, a power transmission apparatus that wirelessly transmits electric power to a power reception apparatus includes a detection unit configured to detect whether an object different from the power transmission apparatus and the power reception apparatus exists, a communication unit configured to perform a communication with the power reception apparatus of information used for performing detection by the detection unit, and a request unit configured to make a request to the power reception apparatus for continuing the communication of information in a case where ending of the communication of information is requested from the power reception apparatus before the communication of information used for performing detection by the detection unit ends.

Further features of the present disclosure will become apparent from the following description of example embodiments with reference to the attached drawings.

BRIEF DESCRIPTION OF THE DRAWINGS

FIG. 13 is a flowchart illustrating an example of a processing procedure which the power transmission apparatus executes in the Negotiation phase in the example embodiment.

FIG. 14 is a flowchart illustrating an example of an exceptional processing procedure which the power reception apparatus executes in the Negotiation phase in the example embodiment.

DESCRIPTION OF THE EMBODIMENTS

Various example embodiments, features, and aspects of the present disclosure will be described in detail below with reference to the drawings. While a plurality of features is described in each example embodiment, not all of the plurality of features is necessarily essential for each embodiment of the present disclosure, and, moreover, the plurality of features can be combined with each other in an optional manner. Additionally, in the accompanying drawings, the same or similar constituent elements are assigned the respective same reference numbers.

[Configuration of Wireless Electric Power Transmission System]

Figure 4:
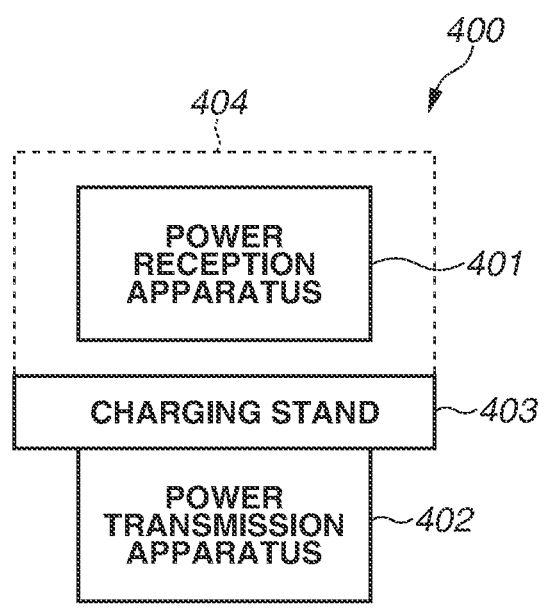
FIG. 4 is a diagram illustrating a configuration example of a wireless electric power transmission system in the example embodiment.

FIG. 4 is a diagram illustrating a configuration example of a wireless electric power transmission system (wireless charging system) 400 in the present example embodiment. The wireless electric power transmission system is configured to include, as an example, a power reception apparatus 401 and a power transmission apparatus 402. Furthermore, the details of configurations of the power reception apparatus 401 and the power transmission apparatus 402 are described below.

The power reception apparatus 401 is an electronic apparatus which receives electric power from the power transmission apparatus 402 and then performs charging to a built-in battery of the power reception apparatus 401. The power transmission apparatus 402 is an electronic apparatus which wirelessly transmits electric power to the power reception apparatus 401, which is placed on the power transmission apparatus 402 via a charging stand 403. Hereinafter, being placed via the charging stand 403 is referred to simply as "being placed on the power transmission apparatus 402". A range 404 surrounded by a dashed line is a range in which the power reception apparatus 401 is able to receive electric power from the power transmission apparatus 402. Furthermore, each of the power reception apparatus 401 and the power transmission apparatus 402 has the function of executing applications other than that for wireless charging. Moreover, in the following description, an object contained in the range in which the power transmission apparatus 402 is able to transmit electric power and different from the power transmission apparatus 402 and the power reception apparatus 401 is referred to as a "foreign object".

Furthermore, in the following description, "the power reception apparatus 401 being placed on the power transmission apparatus 402" is assumed to represent "the power reception apparatus 401 being in the state of being contained in a range available for electric power transmission by the power transmission apparatus 402".

The range available for electric power transmission by the power transmission apparatus 402 is a range in which the power transmission apparatus 402 is able to transmit electric power to the power reception apparatus 401 with use of a transmission coil. Moreover, the state in which the power reception apparatus 401 is placed on the power transmission apparatus 402 does not need to be the state in which the power reception apparatus 401 and the power transmission apparatus 402 are in contact with each other. For example, the state in which the power reception apparatus 401 being in no contact with the power transmission apparatus 402 is contained in the range available for electric power transmission by the power transmission apparatus 402 is also assumed to be deemed as the state in which "the power reception apparatus 401 is placed on the power transmission apparatus 402". Moreover, the power reception apparatus 401 can be configured not to be placed on the power transmission apparatus 402 but to be arranged, for example, at the side surface of the power transmission apparatus 402.

Furthermore, each of the power reception apparatus 401 and the power transmission apparatus 402 has the function of executing applications other than that for wireless charging. An example of the power reception apparatus 401 is an information processing terminal such as a smartphone, and an example of the power transmission apparatus 402 is an accessory device used to charge the information processing terminal. For example, the information processing terminal includes a display unit (display) which displays information to the user, to which electric power received from a power reception coil (antenna) is supplied. Moreover, electric power received from the power reception coil is accumulated in an electricity storage unit (battery), and electric power is supplied from the battery to the display unit. In this case, the power reception apparatus 401 can be configured to include a communication unit which communicates with another apparatus different from the power transmission apparatus 402. The communication unit can be compliant with a communication standard such as the Near Field Communication (NFC) or the Fifth-generation Mobile Communication System (5G). Moreover, in this case, in response to electric power being supplied from the battery to the communication unit, the communication unit can perform communication. Moreover, the power reception apparatus 401 can be a tablet terminal or a storage device such as a hard disk drive or a memory device, or can be an information processing apparatus such as a personal computer (PC). Moreover, the power reception apparatus 401 can be, for example, an image capturing apparatus (for example, a camera or a video camera). Moreover, the power reception apparatus 401 can be an image input device such as a scanner or can be an image output device such as a printer, a copying machine, or a projector. Moreover, the power reception apparatus 401 can be, for example, a robot or a medical device. The power transmission apparatus 402 can be an apparatus which charges the above-mentioned devices.

Moreover, the power transmission apparatus 402 can be a smartphone. In this case, the power reception apparatus 401 can be another smartphone or can be wireless earphones.

Moreover, the power reception apparatus 401 in the present example embodiment can be a vehicle such as an automobile. For example, the automobile being the power reception apparatus 401 can be the one which receives electric power from a charger (power transmission apparatus 402) via a power transmission antenna mounted in a parking. Moreover, the automobile being the power reception apparatus 401 can be the one which receives electric power from a charger (power transmission apparatus 402) via a power transmission coil (antenna) embedded in a road. In such an automobile, the received electric power is supplied to a battery of the automobile. Electric power stored in the battery can be supplied to a kinetic generation unit (motor or electric actuator), or can be used for driving of a sensor for use in driver assistance or for driving of a communication unit for performing communication with an external apparatus. Thus, in this case, the power reception apparatus 401 can be configured to include, in addition to wheels, a battery, a motor or a sensor which operates to be driven with use of the received electric power, and a communication unit which performs communication with another apparatus other than the power transmission apparatus 402. Additionally, the power reception apparatus 401 can include an accommodation unit which accommodates a person or persons. For example, the sensor includes a sensor which is used to measure an inter-vehicular distance or a distance to another obstacle. The communication unit can be compatible with, for example, the Global Positioning System or Global Positioning Satellite (GPS). Moreover, the communication unit can be compliant with a communication standard such as the Fifth-generation Mobile Communication System (5G). Moreover, the vehicle can also be, for example, a bicycle or a motorcycle. Moreover, the power reception apparatus 401 is not limited to vehicles but can be, for example, a moving body or a flying object which includes a kinetic generation unit which operates to be driven with use of electric power stored in a battery.

Moreover, the power reception apparatus 401 in the present example embodiment can be, for example, an electric power tool or household appliances. These devices being the power reception apparatus 401 can include, in addition to a battery, a motor which operates to be driven by the received electric power stored in the battery. Moreover, these devices can include a communication unit which issues a notification about, for example, the remaining amount of power of the battery. Moreover, these devices can include a communication unit which communicates with another apparatus different from the power transmission apparatus 402. The communication unit can be compliant with a communication standard such as the Near Field Communication (NFC) or the Fifth-generation Mobile Communication System (5G).

Moreover, the power transmission apparatus 402 in the present example embodiment can be an in-vehicle charger which performs charging to a mobile information terminal device, such as a smartphone or tablet, compatible with wireless electric power transmission in a vehicle such as an automobile. Such an in-vehicle charger can be provided anywhere in an automobile. For example, the in-vehicle charger can be mounted at a console of the automobile, or can be mounted at an instrument panel (control panel or dashboard) of the automobile, at a position between seats for passengers, a ceiling, or a door of the automobile. However, it is desirable that the in-vehicle charger be not mounted at a position which poses an obstacle to driving. Moreover, while an example in which the power transmission apparatus 402 is an in-vehicle charger has been described, such a charger is not limited to the one mounted in a vehicle but can be mounted in a transport machinery such as a train, an airplane, or a boat or ship. The charger in this case can also be mounted at a position between seats for passengers, a ceiling, or a door of the transport machinery.

Moreover, a vehicle, such as an automobile, equipped with an in-vehicle charger can be the power transmission apparatus 402. In this case, the power transmission apparatus 402 includes wheels and a battery, and supplies electric power to the power reception apparatus 401 via a power transmission circuit unit and a power transmission coil (antenna) with use of electric power stored in the battery.

[Configurations of Power Transmission Apparatus 402 and Power Reception Apparatus 401]

Next, configurations of the power transmission apparatus 402 and the power reception apparatus 401 in the present example embodiment are described. Furthermore, the configurations to be described in the following description are merely examples, so that a part (in some cases, the whole) of the configurations to be described below can be replaced with another configuration which fulfills a similar function or can be omitted, or a further configuration can be added to the configurations to be described below. Additionally, one block illustrated in the following description can be divided into a plurality of blocks, or a plurality of blocks illustrated in the following description can be integrated into one block. Moreover, while each functional block illustrated in the following description is assumed to implement a function thereof as a software program, a part or the whole of each functional block can be implemented as hardware.

Figure 1:
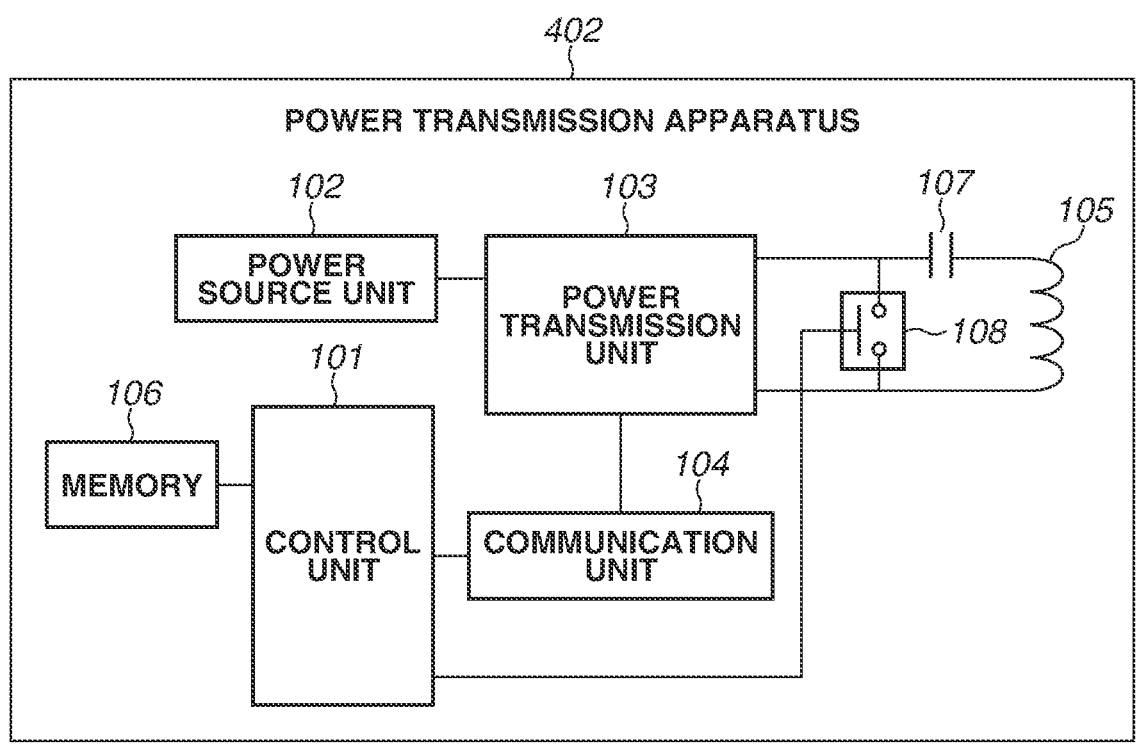
FIG. 1 is a block diagram illustrating an internal configuration example of a power transmission apparatus according to an example embodiment.
Figure 2:
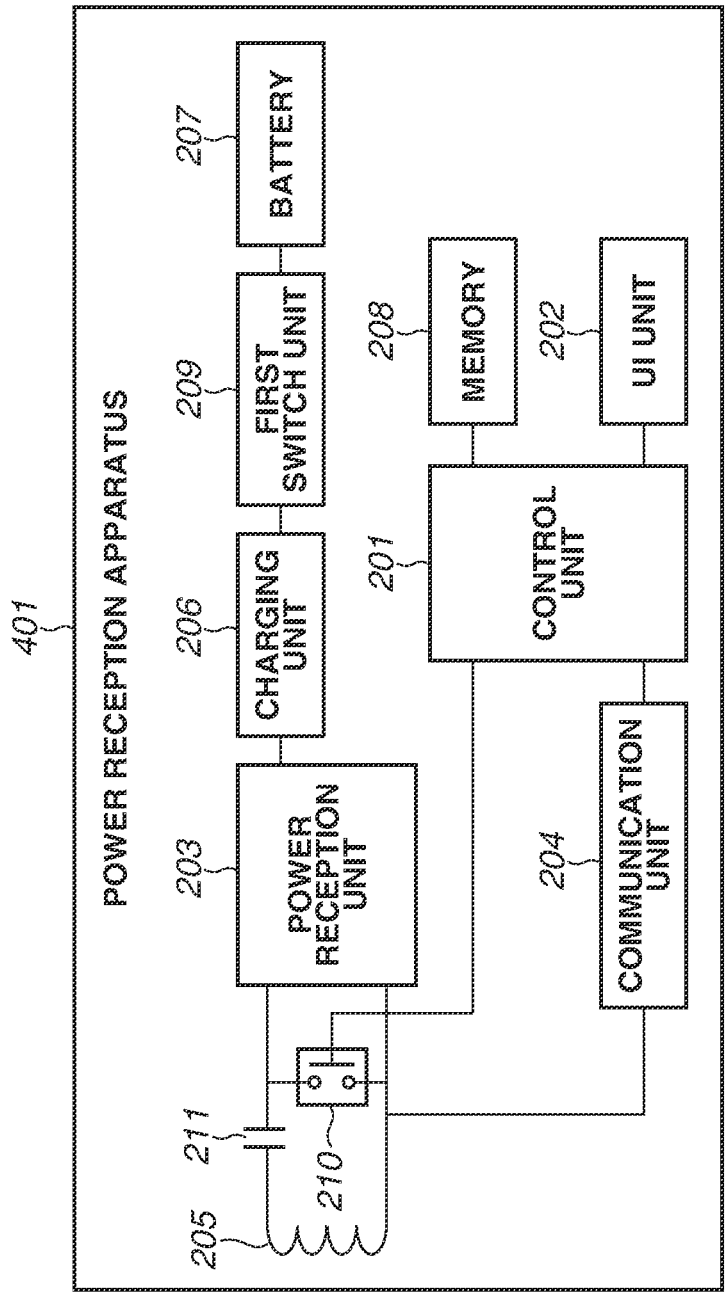
FIG. 2 is a block diagram illustrating an internal configuration example of a power reception apparatus according to the example embodiment.

FIG. 1 is a block diagram illustrating an internal configuration example of the power transmission apparatus 402 according to the present example embodiment. Moreover, FIG. 2 is a block diagram illustrating an internal configuration example of the power reception apparatus 401 according to the present example embodiment. The power transmission apparatus 402 includes a control unit 101, a power source unit 102, a power transmission unit 103, a communication unit 104, a power transmission antenna 105, a memory 106, a resonance capacitor 107, and a switch 108. While, in FIG. 1, the control unit 101, the power source unit 102, the power transmission unit 103, the communication unit 104, and the memory 106 are illustrated as respective separate units, an optional plurality of functional blocks out of these units can be mounted within one and the same chip.

The control unit 101 controls the entire power transmission apparatus 402 by executing a control program stored in, for example, the memory 106. Moreover, the control unit 101 performs control concerning power transmission control including a communication for device authentication in the power transmission apparatus 402. Additionally, the control unit 101 can perform control for executing applications other than that for wireless electric power transmission. The control unit 101 is configured to include one or more processors, such as a central processing unit (CPU) or a micro processing unit (MPU). Furthermore, the control unit 101 can be configured with hardware such as an application specific integrated circuit (ASIC). Moreover, the control unit 101 can be configured to include an array circuit, such as a field-programmable gate array (FPGA), compiled in such a way as to perform predetermined processing. The control unit 101 causes the memory 106 to store information which is to be stored during execution of various processing operations. Moreover, the control unit 101 measures time with use of a timer (not illustrated).

The power source unit 102 supplies electricity to each functional block. The power source unit 102 is, for example, a commercial power source or a battery. The battery stores electric power supplied from a commercial power source.

The power transmission unit 103 causes electromagnetic waves, which causes the power reception apparatus 401 to receive electric power, to be generated, by converting direct-current power or alternating-current power input from the power source unit 102 into alternating-current frequency power of a frequency band used for wireless electric power transmission and outputting the alternating-current frequency power to the power transmission antenna 105. For example, the power transmission unit 103 converts a direct-current voltage supplied from the power source unit 102 into an alternating-current voltage with use of a switching circuit with a half-bridge or full-bridge configuration using a field-effect transistor (FET). In this case, the power transmission unit 103 includes a gate driver which controls turning-on and turning-off of the FET.

Moreover, the power transmission unit 103 controls the intensity of electromagnetic waves to be output, by adjusting a voltage (power transmission voltage) or current (power transmission current) to be output to the power transmission antenna 105 or adjusting both the voltage (power transmission voltage) and current (power transmission current). As the power transmission voltage or power transmission current is made larger, the intensity of electromagnetic waves becomes stronger, and, as the power transmission voltage or power transmission current is made smaller, the intensity of electromagnetic waves becomes weaker. Moreover, based on an instruction from the control unit 101, the power transmission unit 103 performs output control of alternating-current frequency power in such a way as to start or end power transmission from the power transmission antenna 105. Moreover, the power transmission unit 103 is assumed to be capable of supplying electric power sufficient to output electric power of 15 watts (W) to a charging unit 206 of the power reception apparatus 401 compatible with the Wireless Power Consortium (WPC) standard.

The communication unit 104 performs communication for power transmission control that is based on the WPC standard with the power reception apparatus 401. The communication unit 104 performs frequency-shift keying on electromagnetic waves to be output from the power transmission antenna 105 and transmits such information to the power reception apparatus 401, thus performing communication. Moreover, the communication unit 104 receives information transmitted by the power reception apparatus 401, by demodulating electromagnetic waves subjected to amplitude modulation or load modulation by the power reception apparatus 401 received via the power transmission antenna 105. Thus, a communication which the communication unit 104 performs is performed with a signal being superimposed on electromagnetic waves to be transmitted from the power transmission antenna 105. Moreover, the communication unit 104 can perform communication with the power reception apparatus 401 by a standard different from the WPC standard using an antenna different from the power transmission antenna 105, or can perform communication with the power reception apparatus 401 while selectively using a plurality of communications. Examples of such a communication standard include Bluetooth® Low Energy (BLE) and Near Field Communication (NFC).

The memory 106 not only stores a control program but also stores, for example, the states of the power transmission apparatus 402 and the power reception apparatus 401 (such as a transmitted electric power value and a received electric power value). For example, the state of the power transmission apparatus 402 is acquired by the control unit 101, and the state of the power reception apparatus 401 is acquired by a control unit 201 of the power reception apparatus 401 and is then received via the communication unit 104.

The switch 108 is controlled by the control unit 101. The power transmission antenna 105 is connected to the resonance capacitor 107, and, in a case where the switch 108 is turned on to be short-circuited, the power transmission antenna 105 and the resonance capacitor 107 become a series resonance circuit and resonate at a specific frequency f1. At this time, a current flows through a closed circuit which the power transmission antenna 105, the resonance capacitor 107, and the switch 108 form. When the switch 108 is turned off to be opened, electric power is supplied from the power transmission unit 103 to the power transmission antenna 105 and the resonance capacitor 107.

Next, an internal configuration example of the power reception apparatus 401 according to the present example embodiment is described with reference to FIG. 2. The power reception apparatus 401 includes a control unit 201, a user interface (UI) unit 202, a power reception unit 203, a communication unit 204, a power reception antenna 205, a charging unit 206, a battery 207, a memory 208, a first switch unit 209, a second switch unit 210, and a resonance capacitor 211. Furthermore, a plurality of functional blocks illustrated in FIG. 2 can be implemented as a single hardware module.

The control unit 201 controls the entire power reception apparatus 401 by executing a control program stored in, for example, the memory 208. Thus, the control unit 201 controls the respective functional units illustrated in FIG. 2. Additionally, the control unit 201 can perform control to execute applications other than that for wireless electric power transmission. The control unit 201 is configured to include one or more processors, such as a CPU or an MPU. Furthermore, the control unit 201 can be configured to control the entire power reception apparatus 401 by operating in cooperation with an operating system (OS) which the control unit 201 is executing.

Moreover, the control unit 201 can be configured with hardware such as an ASIC. Moreover, the control unit 201 can be configured to include an array circuit, such as an FPGA, compiled in such a way as to perform predetermined processing. The control unit 201 causes the memory 208 to store information which is to be stored during execution of various processing operations. Moreover, the control unit 201 measures time with use of a timer (not illustrated).

The UI unit 202 performs various types of outputting to the user. The various types of outputting as mentioned here are operations such as screen display, blinking or color change of a light-emitting diode (LED), audio output by a loudspeaker, and vibration of the body of the power reception apparatus 401. The UI unit 202 is implemented by, for example, a liquid crystal panel, a loudspeaker, or a vibration motor.

The power reception unit 203 acquires, via the power reception antenna 205, alternating-current electric power (alternating-current voltage and alternating-current current) generated by electromagnetic induction that is based on electromagnetic waves radiated from the power transmission antenna 105 of the power transmission apparatus 402. Then, the power reception unit 203 converts the alternating-current electric power into direct-current electric power or alternating-current electric power of a predetermined frequency and then outputs the electric power to the charging unit 206, which performs processing for charging the battery 207. Thus, the power reception unit 203 includes a rectifying unit and a voltage control unit, which are required to supply electric power to a load included in the power reception apparatus 401. The power reception unit 203 supplies electric power which the charging unit 206 uses to charge the battery 207, and is assumed to be capable of supplying electric power sufficient to output electric power of 15 W to the charging unit 206.

The communication unit 204 performs communication for power reception control that is based on the WPC standard with the communication unit 104 included in the power transmission apparatus 402. The communication unit 204 acquires information transmitted from the power transmission apparatus 402, by demodulating electromagnetic waves input from the power reception antenna 205. Then, the communication unit 204 performs communication with the power transmission apparatus 402 by superimposing a signal concerning information to be transmitted to the power transmission apparatus 402 on electromagnetic waves obtained by performing amplitude modulation or load modulation on the input electromagnetic waves. Furthermore, the communication unit 204 can perform communication with the power transmission apparatus 402 by a standard different from the WPC standard using an antenna different from the power reception antenna 205, or can perform communication with the power transmission apparatus 402 while selectively using a plurality of communications. Examples of such a communication standard include the above-mentioned BLE and NFC.

The memory 208 not only stores a control program but also stores, for example, information concerning the states of the power transmission apparatus 402 and the power reception apparatus 401. For example, the state of the power reception apparatus 401 is acquired by the control unit 201, and information concerning the state of the power transmission apparatus 402 is acquired by the control unit 101 of the power transmission apparatus 402 and is then received via the communication unit 204.

The first switch unit 209 and the second switch unit 210 are controlled by the control unit 201. The power reception antenna 205 is connected to the resonance capacitor 211, and, in a case where the second switch unit 210 is turned on to be short-circuited, the power reception antenna 205 and the resonance capacitor 211 become a series resonance circuit and resonate at a specific frequency f2. At this time, a current flows through a closed circuit which the power reception antenna 205, the resonance capacitor 211, and the second switch unit 210 form, and no current flows through the power reception unit 203. When the second switch unit 210 is turned off to be opened, electric power received by the power reception antenna 205 and the resonance capacitor 211 is supplied to the power reception unit 203.

The first switch unit 209 is used to control whether to supply the received electric power to the battery 207 serving as a load. Moreover, the first switch unit 209 has also the function of controlling the value of the load. When the first switch unit 209 connects the charging unit 206 and the battery 207 to each other, the received electric power is supplied to the battery 207. When the first switch unit 209 disconnects the charging unit 206 and the battery 207 from each other, the received electric power is not supplied to the battery 207. Furthermore, in FIG. 2, the first switch unit 209 is located between the charging unit 206 and the battery 207, but can be located between the power reception unit 203 and the charging unit 206. Alternatively, the first switch unit 209 can be located between the closed circuit, which the power reception antenna 205, the resonance capacitor 211, and the second switch unit 210 form, and the power reception unit 203. Thus, the first switch unit 209 can be used to control whether to supply the received electric power to the power reception unit 203. Moreover, while, in FIG. 2, the first switch unit 209 is illustrated as a single block, the first switch unit 209 can be implemented as a part of the charging unit 206 or a part of the power reception unit 203.

Figure 3:
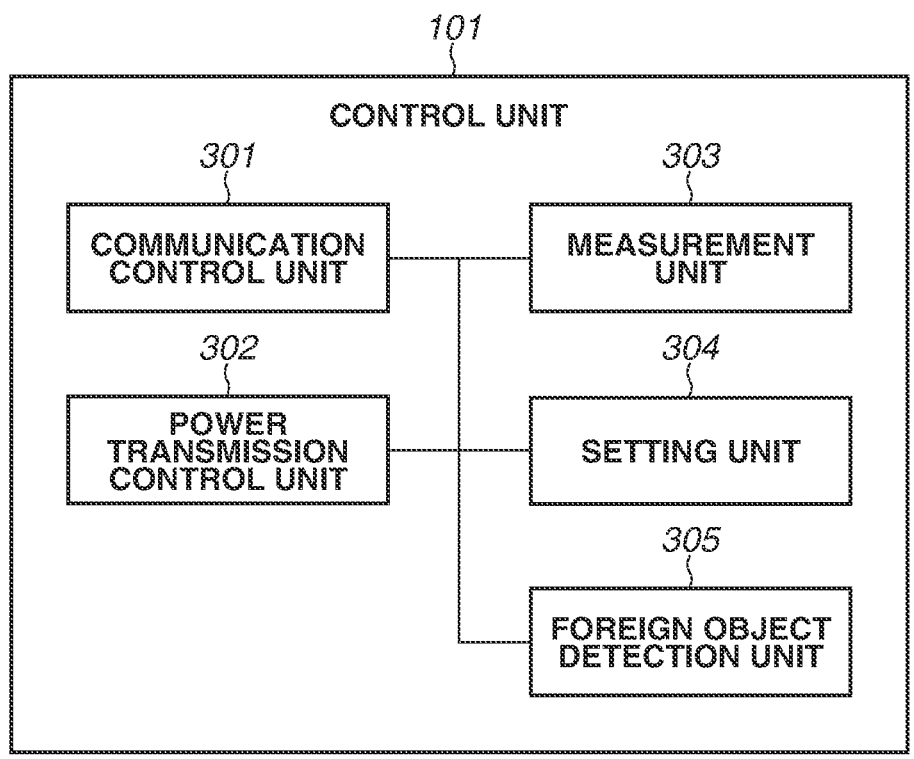
FIG. 3 is a block diagram illustrating a functional configuration example of a control unit included in the power transmission apparatus.

Next, functions of the control unit 101 of the power transmission apparatus 402 are described with reference to FIG. 3. FIG. 3 is a block diagram illustrating a functional configuration example of the control unit 101 of the power transmission apparatus 402. The control unit 101 includes a communication control unit 301, a power transmission control unit 302, a measurement unit 303, a setting unit 304, and a foreign object detection unit 305.

The communication control unit 301 performs communication control with the power reception apparatus 401 that is based on the WPC standard via the communication unit 104. The power transmission control unit 302 controls the power transmission unit 103, thus controlling power transmission to the power reception apparatus 401. The measurement unit 303 measures a waveform attenuation index described below. Moreover, the measurement unit 303 measures electric power to be transmitted to the power reception apparatus 401 via the power transmission unit 103, and measures average transmitted electric power for every unit time. Moreover, the measurement unit 303 measures a quality factor (Q value) of the power transmission antenna (power transmission coil) 105.

The foreign object detection unit 305 implements foreign object detection by a power loss method, foreign object detection by a Q value measuring method, and foreign object detection using a change of attenuation of energy waveform (hereinafter referred to as "foreign object detection by a waveform attenuation method"). Furthermore, the details of the power loss method, the Q value measuring method, and the waveform attenuation method are described below.

Moreover, the foreign object detection unit 305 can have the function of performing foreign object detection by using another method. For example, in the power transmission apparatus 402 having an NFC communication function, the foreign object detection unit 305 can perform foreign object detection processing with use of an opposing device detection function in the NFC standard. Moreover, the power transmission apparatus 402 is able to detect that the state of a unit on the power transmission apparatus 402 has changed, as a function other than the function of detecting a foreign object. For example, the foreign object detection unit 305 is also able to detect an increase or decrease of the number of power reception apparatuses 401 on the power transmission apparatus 402.

The setting unit 304 sets a threshold value serving as a criterion for determining the presence or absence of a foreign object when the power transmission apparatus 402 performs foreign object detection by the power loss method, the Q value measuring method, or the waveform attenuation method. For example, the setting unit 304 sets a threshold value used for foreign object detection based on a waveform attenuation index measured by the measurement unit 303. Moreover, the setting unit 304 can have the function of setting a threshold value serving as a criterion for determining the presence or absence of a foreign object, which becomes necessary to perform foreign object detection processing using another method. This enables the foreign object detection unit 305 to perform foreign object detection processing based on a threshold value set by the setting unit 304 and a waveform attenuation index, transmitted electric power, or Q value measured by the measurement unit 303.

The functions of the communication control unit 301, the power transmission control unit 302, the measurement unit 303, the setting unit 304, and the foreign object detection unit 305 are implemented as programs which run in the control unit 101. The respective processing units are configured as separate independent programs and are able to operate in parallel with each other while taking synchronization between programs by, for example, event processing. However, two or more units of these processing units can be incorporated into a single program.

The present system performs wireless electric power transmission using an electromagnetic induction method for wireless charging based on the WPC standard. Thus, the power reception apparatus 401 and the power transmission apparatus 402 perform wireless electric power transmission for wireless charging that is based on the WPC standard, between the power reception antenna 205 of the power reception apparatus 401 and the power transmission antenna 105 of the power transmission apparatus 402. Furthermore, the wireless electric power transmission method which is applied to the present system is not limited to a method defined in the WPC standard, but can be another electromagnetic induction method, a magnetic field resonance method, an electric field resonance method, a microwave method, or a method using, for example, laser. Moreover, while, in the present example embodiment, wireless electric power transmission is assumed to be used for wireless charging, wireless electric power transmission can be performed for purposes other than wireless charging.

In the WPC standard, the magnitude of electric power which is guaranteed when the power reception apparatus 401 receives electric power from the power transmission apparatus 402 is defined by a value called Guaranteed Power (hereinafter referred to as "GP"). GP represents an electric power value which is guaranteed to be output to a load (for example, a circuit for charging or a battery) included in the power reception apparatus 401 even if, for example, the efficiency of electric power transmission between the power reception antenna 205 and the power transmission antenna 105 decreases due to a positional relationship between the power reception apparatus 401 and the power transmission apparatus 402 varying. For example, in a case where GP is 5 W, even if the efficiency of electric power transmission decreases due to a positional relationship between the power reception antenna 205 and the power transmission antenna 105 varying, the power transmission apparatus 402 performs electric power transmission by performing control in such a way as to be able to output electric power of 5 W to a load included in the power reception apparatus 401.

Moreover, in a case where, when electric power transmission is performed from the power transmission apparatus 402 to the power reception apparatus 401, a foreign object, which is an object different from the power reception apparatus 401, exists near the power transmission apparatus 402, electromagnetic waves for electric power transmission may exert an influence on the foreign object, thus increasing the temperature of the foreign object or destroying the foreign object. Therefore, in the WPC standard, to enable preventing the temperature increase or destruction of a foreign object by stopping electric power transmission when the foreign object exists, a method in which the power transmission apparatus 402 detects that the foreign object exists on the charging stand 403 is defined. Specifically, a power loss method, which detects a foreign object based on a difference between transmitted electric power in the power transmission apparatus 402 and received electric power in the power reception apparatus 401, is defined. Moreover, in the WPC standard, as a foreign object detection method, a Q value measuring method, which detects a foreign object based on a change of the quality factor (Q value) of the power transmission antenna (power transmission coil) 105 in the power transmission apparatus 402, is also defined. Furthermore, a foreign object which the power transmission apparatus 402 in the present example embodiment detects is not limited to an object existing on the charging stand 403. The power transmission apparatus 402 only needs to detect a foreign object located near the power transmission apparatus 402, and, for example, the power transmission apparatus 402 can be configured to detect a foreign object located in a range in which the power transmission apparatus 402 is able to transmit electric power.

[Foreign Object Detection Method that is Based on Power Loss Method]

Figure 8:
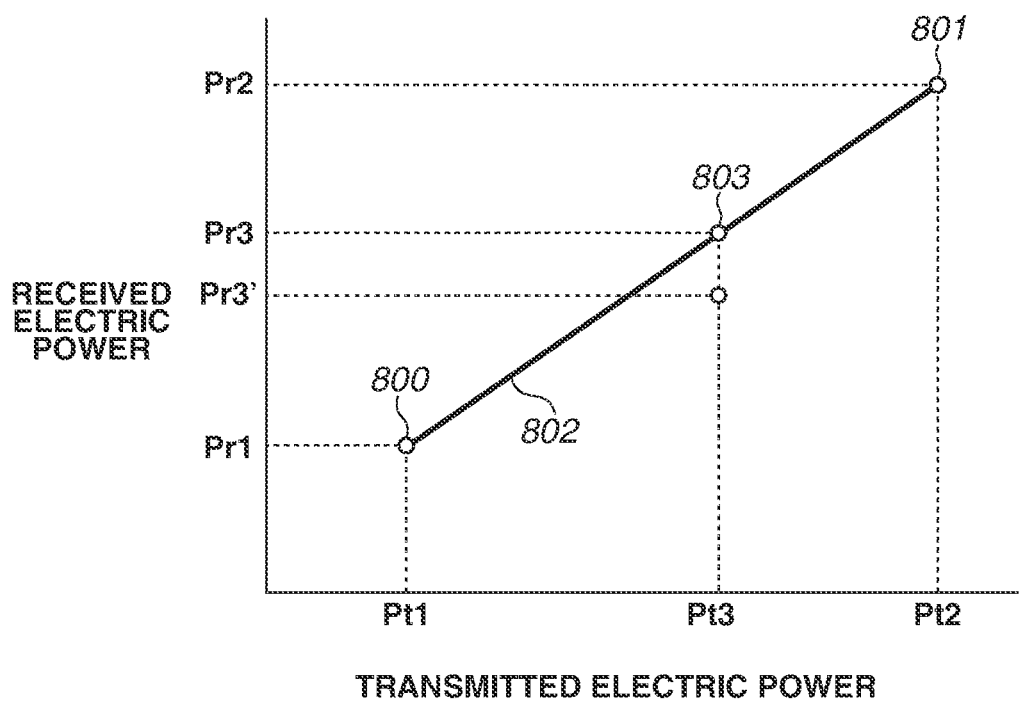
FIG. 8 is a diagram used to explain a foreign object detection method using a power loss method.

Next, a foreign object detection method that is based on the power loss method defined in the WPC standard is described with reference to FIG. 8. The horizontal axis in FIG. 8 represents transmitted electric power in the power transmission apparatus 402, and the vertical axis represents received electric power in the power reception apparatus 401. A foreign object as mentioned here is an object other than the power reception apparatus 401, which may exert an influence on electric power transmission from the power transmission apparatus 402 to the power reception apparatus 401, and is, for example, an object, such as a metallic piece, having electrical conductivity.

First, the power transmission apparatus 402 performs electric power transmission to the power reception apparatus 401 at a first transmitted electric power value Pt1.

The power reception apparatus 401 receives electric power at a first received electric power value Pr1 (this state being referred to as a "state of Light Load (light load state)"). Then, the power transmission apparatus 402 stores the first transmitted electric power value Pt1. Here, the first transmitted electric power value Pt1 or the first received electric power value Pr1 is a preliminarily determined minimum transmitted electric power or received electric power. At this time, the power reception apparatus 401 controls a load (such as a charging circuit or a battery) in such a manner that electric power to be received becomes minimum electric power. For example, the power reception apparatus 401 can disconnect the load from the power reception antenna 205 so as to prevent the received electric power from being supplied to the load.

Subsequently, the power reception apparatus 401 reports the first received electric power value Pr1 to the power transmission apparatus 402. Upon receiving information about the first received electric power value Pr1 from the power reception apparatus 401, the power transmission apparatus 402 calculates a power loss "Pt1−Pr1" ($P_{loss1}$) occurring between the power transmission apparatus 402 and the power reception apparatus 401. Then, the power transmission apparatus 402 creates a calibration point 800 representing a correspondence between the first transmitted electric power value Pt1 and the first received electric power value Pr1.

Subsequently, the power transmission apparatus 402 changes the transmitted electric power value to a second transmitted electric power value Pt2 and performs electric power transmission to the power reception apparatus 401. The power reception apparatus 401 receives electric power at a second received electric power value Pr2 (this state being referred to as a "state of Connected Load (load connected state)"). Then, the power transmission apparatus 402 stores the second transmitted electric power value Pt2. Here, the second transmitted electric power value Pt2 or the second received electric power value Pr2 is a preliminarily determined maximum transmitted electric power or received electric power. At this time, the power reception apparatus 401 controls the load in such a manner that electric power to be received becomes maximum electric power. For example, the power reception apparatus 401 connects the power reception antenna 205 and the load to each other so as to allow the received electric power to be supplied to the load.

Subsequently, the power reception apparatus 401 reports the second received electric power value Pr2 to the power transmission apparatus 402. Upon receiving information about the second received electric power value Pr2 from the power reception apparatus 401, the power transmission apparatus 402 calculates a power loss "Pt2−Pr2" ($P_{loss2}$) occurring between the power transmission apparatus 402 and the power reception apparatus 401. Then, the power transmission apparatus 402 creates a calibration point 801 representing a correspondence between the second transmitted electric power value Pt2 and the second received electric power value Pr2.

Then, the power transmission apparatus 402 creates a straight line 802 which is linearly interpolated between the calibration point 800 and the calibration point 801. The straight line 802 represents a relationship between the transmitted electric power and the received electric power occurring in a state in which no foreign object exists near the power transmission apparatus 402 and the power reception apparatus 401. Based on the straight line 802, the power transmission apparatus 402 is able to predict an electric power value which the power reception apparatus 401 receives in a case where the power transmission apparatus 402 has performed electric power transmission at predetermined transmitted electric power in a state in which no foreign object exists. For example, in a case where the power transmission apparatus 402 has performed electric power transmission at a third transmitted electric power value Pt3, based on a point 803 corresponding to the value Pt3 on the straight line 802, the power transmission apparatus 402 is able to estimate that the received electric power value which the power reception apparatus 401 receives becomes a third received electric power value Pr3.

In the above-described way, based on a plurality of combinations of the transmitted electric power value by the power transmission apparatus 402 and the received electric power value by the power reception apparatus 401 which have been measured with the load being changed, it is possible to obtain a power loss between the power transmission apparatus 402 and the power reception apparatus 401 corresponding to the load. Moreover, based on an interpolation obtained from the plurality of combinations, it is possible to estimate power losses between the power transmission apparatus 402 and the power reception apparatus 401 corresponding to all of the loads. Calibration processing which the power transmission apparatus 402 and the power reception apparatus 401 perform in this way in order for the power transmission apparatus 402 to acquire a combination of the transmitted electric power value and the received electric power value is hereinafter referred to as "calibration processing (CAL processing) in the power loss method".

Suppose that, in a case where, after the CAL processing, the power transmission apparatus 402 has actually performed electric power transmission at the third transmitted electric power value Pt3 to the power reception apparatus 401, the power transmission apparatus 402 has received a received electric power value Pr3' from the power reception apparatus 401. The power transmission apparatus 402 calculates a value "Pr3−Pr3'" ($=P_{loss}\_FO$) by subtracting the received electric power value Pr3' actually received from the power reception apparatus 401 from the third received electric power value Pr3 which is to be obtained in a state in which no foreign object exists. This electric power value $P_{loss}\_FO$ is able to be considered as a power loss which, in a case where a foreign object exists near the power transmission apparatus 402 and the power reception apparatus 401, is consumed by the foreign object. Therefore, in a case where the electric power value $P_{loss}\_FO$, which may have been consumed by any foreign object, has exceeded a preliminarily determined threshold value, the power transmission apparatus 402 is able to determine that a foreign object exists.

Alternatively, the power transmission apparatus 402 can preliminarily obtain a power loss "Pt3−Pr3" ($P_{loss}3$) occurring between the power transmission apparatus 402 and the power reception apparatus 401 based on the third received electric power value Pr3 which is to be obtained in a state in which no foreign object exists. Then, the power transmission apparatus 402 can obtain a power loss "Pt3−Pr3'" ($P_{loss}3'$) occurring between the power transmission apparatus 402 and the power reception apparatus 401 in a state in which a foreign object exists, based on the received electric power value Pr3' received from the power reception apparatus 401 in a state in which a foreign object exists. Then, the power transmission apparatus 402 can use "$P_{loss}3'-P_{loss}3$" ($=P_{loss}\_FO$) to estimate an electric power value $P_{loss}\_FO$ which may have been consumed by any foreign object.

In the above-described way, the method of obtaining the electric power value $P_{loss}\_FO$ which may have been consumed by any foreign object can include using "Pr3−Pr3'" ($=P_{loss}\_FO$) or can include using "$P_{loss}3'-P_{loss}3$" ($=P_{loss}\_FO$). While, in the present example embodiment, basically, the method of using "$P_{loss}3'-P_{loss}3$" ($=P_{loss}\_FO$) is described, the method of using "Pr3−Pr3'" ($=P_{loss}\_FO$) can also be applied.

After the straight line 802 is obtained by the calibration processing, the foreign object detection unit 305 of the power transmission apparatus 402 periodically receives the current received electric power value (for example, the above-mentioned received electric power value Pr3') from the power reception apparatus 401 via the communication unit 104. The current received electric power value which the power reception apparatus 401 periodically transmits is transmitted as Received Power Packet (mode 0) (hereinafter referred to as "RP0") to the power transmission apparatus 402. The foreign object detection unit 305 of the power transmission apparatus 402 performs foreign object detection based on a received electric power value stored in the RP0 and the straight line 802.

[Description of Each Phase Until Electric Power Transmission is Performed]

Foreign object detection by the power loss method is performed during electric power transmission (power transfer) (in Power Transfer phase described below) based on data obtained by Calibration phase described below. Moreover, foreign object detection by the Q value measuring method is performed before electric power transmission (before Digital Ping transmission described below, in Negotiation phase described below, or in Renegotiation phase described below).

The power reception apparatus 401 and the power transmission apparatus 402 in the present example embodiment perform communication for electric power transmission and reception control that is based on the WPC standard. In the WPC standard, a plurality of phases including Power Transfer phase, in which electric power transmission is performed, and one or more phases, which are before actual electric power transmission, is defined, and communications for electric power transmission and reception control required in the respective phases are performed. The phases before electric power transmission include Selection phase, Ping phase, Identification and Configuration phase, Negotiation phase, and Calibration phase. Furthermore, in the following description, the Identification and Configuration phase is referred to as "I&C phase". Basic processing in each phase is described as follows.

In the Selection phase, the power transmission apparatus 402 intermittently transmits Analog Ping and detects that an object has been placed on the power transmission apparatus 402 (for example, that the power reception apparatus 401 or, for example, a conductor piece has been placed on the charging stand 403). The power transmission apparatus 402 detects at least any one of a voltage value and a current value of the power transmission antenna 105 obtained when the power transmission apparatus 402 has transmitted Analog Ping, and, in a case where the voltage value falls below a given threshold value or the current value exceeds a given threshold value, the power transmission apparatus 402 determines that a foreign object exists, and then transitions to the Ping phase.

In the Ping phase, the power transmission apparatus 402 transmits Digital Ping, which is larger in electric power than Analog Ping. The magnitude of electric power of the Digital Ping corresponds to that of electric power sufficient for the control unit 201 of the power reception apparatus 401 placed on the power transmission apparatus 402 to start up. The power reception apparatus 401 notifies the power transmission apparatus 402 of the magnitude of received electric power. In this way, by receiving a response from the power reception apparatus 401 having received the Digital Ping, the power transmission apparatus 402 recognizes that an object detected in the Selection phase is the power reception apparatus 401. Upon receiving the notification of the received electric power value, the power transmission apparatus 402 transitions to the I&C phase. Moreover, before transmitting the Digital Ping, the power transmission apparatus 402 measures a Q value (Q-factor) of the power transmission antenna (power transmission coil) 105. This result of measurement is used in performing foreign object detection processing using the Q value measuring method.

In the I&C phase, the power transmission apparatus 402 identifies the power reception apparatus 401 and acquires device configuration information (capability information) from the power reception apparatus 401. The power reception apparatus 401 transmits ID Packet and Configuration Packet. The ID Packet includes identifier information about the power reception apparatus 401, and the Configuration Packet includes device configuration information (capability information) about the power reception apparatus 401. Upon receiving the ID Packet and the Configuration Packet, the power transmission apparatus 402 makes a response with acknowledge (ACK or positive acknowledgement). Then, the power transmission apparatus 402 ends the I&C phase and transitions to the Negotiation phase as a next phase.

In the Negotiation phase, the value of GP is determined based on, for example, the value of GP which the power reception apparatus 401 requests or the power transmission capability of the power transmission apparatus 402. Moreover, the power transmission apparatus 402 receives, from the power reception apparatus 401, FOD Status Packet in which information about Reference Quality Factor Value is stored, and the setting unit 304 adjusts a threshold value in the Q value measuring method and thus determines a final threshold value. Then, in response to a request from the power reception apparatus 401, the power transmission apparatus 402 causes the foreign object detection unit 305 to perform foreign object detection processing using the Q value measuring method. Here, the information about Reference Quality Factor Value is information about a Q value obtained when the power reception apparatus 401 has been placed on the power transmission apparatus 402 without any foreign object existing thereon. Moreover, in the WPC standard, a method of, after once transitioning to the Power Transfer phase described below, performing processing similar to that in the Negotiation phase again in response to a request from the power reception apparatus 401 is defined. Hereinafter, the phase to which the power transmission apparatus 402 transitions from the Power Transfer phase and in which the power transmission apparatus 402 performs these processing operations is referred to as "Renegotiation phase".

In the Calibration phase, the power transmission apparatus 402 performs calibration processing based on the WPC standard. Moreover, the power reception apparatus 401 notifies the power transmission apparatus 402 of a predetermined received electric power value (a received electric power value for a light load state or a received electric power value for a maximum load state), so that the power transmission apparatus 402 performs adjustment for efficiently transmitting electric power. The received electric power value of which the power transmission apparatus 402 has been informed is used for foreign object detection processing using the power loss method.

In the Power Transfer phase, control operations for, for example, starting and continuation of electric power transmission and stopping of electric power transmission due to error or full charge are performed. To perform such electric power transmission and reception control operations, the power transmission apparatus 402 and the power reception apparatus 401 use the power transmission antenna 105 and the power reception antenna 205, which are used in performing wireless electric power transmission based on the WPC standard, and perform communications while superimposing signals on electromagnetic waves to be transmitted from these antennas. Furthermore, the range in which communications that are based on the WPC standard are possible between the power transmission apparatus 402 and the power reception apparatus 401 is almost similar to a range available for electric power transmission by the power transmission apparatus 402.

[Flow of Processing for Electric Power Transmission Compliant with WPC Standard]

Figure 5:
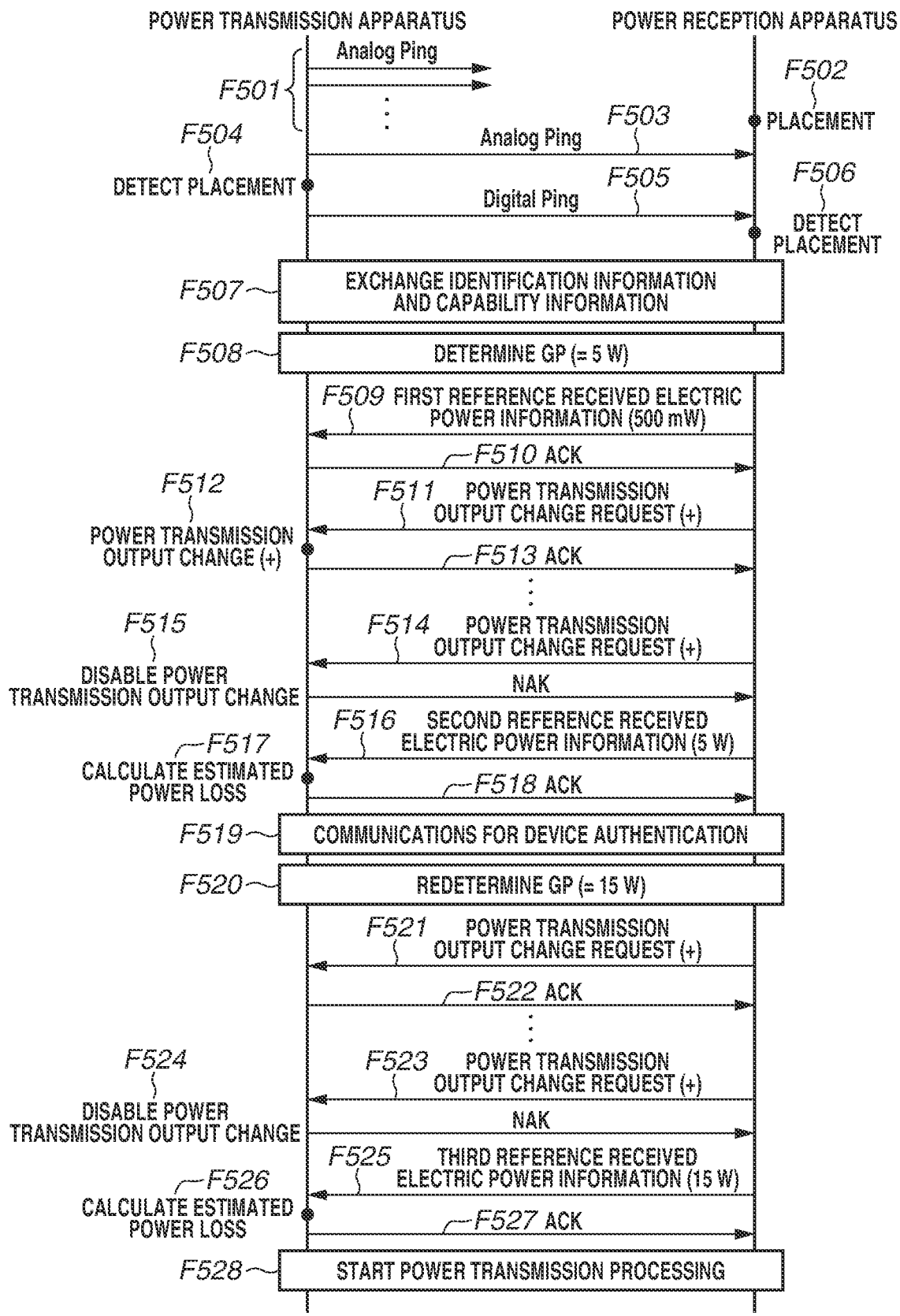
FIG. 5 is a diagram used to explain a sequence for electric power transmission compliant with the Wireless Power Consortium (WPC) standard.

As described above, in the WPC standard, the Selection phase, the Ping phase, the I&C phase, the Negotiation phase, the Calibration phase, and the Power Transfer phase are defined. In the following description, operations of the power transmission apparatus 402 and the power reception apparatus 401 in these phases are described with reference to the sequence diagram of FIG. 5. FIG. 5 is a diagram used to explain a sequence for electric power transmission compliant with the WPC standard. Here, examples of operations of the power transmission apparatus 402 and the power reception apparatus 401 are described.

First, in step F501, to detect an object existing within a range available for electric power transmission, the power transmission apparatus 402 performs repetitive intermittent transmission of Analog Ping of the WPC standard. The power transmission apparatus 402 performs processing defined as the Selection phase and the Ping phase of the WPC standard and waits for the power reception apparatus 401 to be placed on the power transmission apparatus 402. In step F502, the user of the power reception apparatus 401 brings the power reception apparatus 401 close to the power transmission apparatus 402 so as to charge the power reception apparatus 401 (for example, a smartphone). For example, the user of the power reception apparatus 401 brings the power reception apparatus 401 close to the power transmission apparatus 402 by putting the power reception apparatus 401 on the power transmission apparatus 402.

When, in steps F503 and F504, based on the transmitted Analog Ping, the power transmission apparatus 402 transmits detects that an object exists within the range available for electric power transmission, then in step F505, the power transmission apparatus 402 transmits Digital Ping of the WPC standard. Upon receiving the Digital Ping, in step F506, the power reception apparatus 401 recognizes that the power transmission apparatus 402 has detected the power reception apparatus 401. Moreover, when receiving a predetermined response to the Digital Ping, the power transmission apparatus 402 determines that the detected object is the power reception apparatus 401 and the power reception apparatus 401 has been placed on the charging stand 403. Upon detecting placement of the power reception apparatus 401, in step F507, the power transmission apparatus 402 acquires identification information and capability information from the power reception apparatus 401 by a communication in the I&C phase defined in the WPC standard.

Here, the identification information about the power reception apparatus 401 includes Manufacturer Code and Basic Device ID. The capability information about the power reception apparatus 401 includes an information element able to identify the version of the compatible WPC standard and a value (Maximum Power Value) for specifying maximum electric power which the power reception apparatus 401 is able to supply to a load. Additionally, the capability information about the power reception apparatus 401 further includes information indicating whether the power reception apparatus 401 has a Negotiation function of the WPC standard. Furthermore, the power transmission apparatus 402 can acquire identification information and capability information about the power reception apparatus 401 by a method other than the communication in the I&C phase of the WPC standard. Moreover, the identification information can be optional different identification information able to identify the individuality of the power reception apparatus 401, such as Wireless Power ID. The capability information can include information other than the above-mentioned information.

Subsequently, in step F508, the power transmission apparatus 402 determines the value of GP with respect to the power reception apparatus 401 by a communication in the Negotiation phase defined by the WPC standard. Furthermore, in step F508, not only the communication in the Negotiation phase of the WPC standard but also another procedure for determining the value of GP can be performed. Moreover, when, for example, at the time of information acquisition in step F507, the power transmission apparatus 402 has acquired information indicating that the power reception apparatus 401 is not compatible with the Negotiation phase, the power transmission apparatus 402 can, without performing a communication in the Negotiation phase, set the value of GP to a small (for example, preliminarily defined in the WPC standard) value. In the present example embodiment, it is assumed that, in step F508, the power transmission apparatus 402 determines that the value of GP is 5 W.

After determining the value of GP, the power transmission apparatus 402 transitions to the Calibration phase, and performs calibration processing based on the determined value of GP. In the calibration processing, first, in step F509, the power reception apparatus 401 transmits, to the power transmission apparatus 402, information (first reference received electric power information) including received electric power in the light load state (a load disconnected state or a load state for making transmitted electric power less than or equal to a first threshold value). The first reference received electric power information in the present example embodiment is assumed to be the received electric power information about the power reception apparatus 401 obtained when the transmitted electric power by the power transmission apparatus 402 is 250 milliwatts (mW). While the first reference received electric power information is transmitted while being stored in Received Power Packet (mode 1) (hereinafter referred to as "RP1") defined by the WPC standard, another message can also be used. The power transmission apparatus 402 determines whether to accept the first reference received electric power information, based on the power transmission state of the power transmission apparatus 402 itself. In step F510, in the case of accepting such information, the power transmission apparatus 402 transmits a positive acknowledgement=ACK to the power reception apparatus 401, and, in the case of not accepting such information, the power transmission apparatus 402 transmits a negative acknowledgement=NAK to the power reception apparatus 401.

Next, upon receiving ACK from the power transmission apparatus 402, the power reception apparatus 401 performs processing for transmitting, to the power transmission apparatus 402, information (second reference received electric power information) including received electric power in the load connected state (a maximum load state or a load state for making transmitted electric power greater than or equal to a second threshold value). In the present example embodiment, since, in the current stage, the GP is 5 W, the second reference received electric power information is assumed to be the received electric power information about the power reception apparatus 401 obtained when the transmitted electric power by the power transmission apparatus 402 is 5 W. While the second reference received electric power information is stored in Received Power Packet (mode 2) (hereinafter referred to as "RP2") defined by the WPC standard, another message can also be used. First, as a stage before transmitting the second reference received electric power information, in step F511, to increase the transmitted electric power from the power transmission apparatus 402 to 5 W, the power reception apparatus 401 transmits a power transmission output change instruction including a positive value.

In steps F512 and F513, the power transmission apparatus 402 receives the above-mentioned power transmission output change instruction, and, in a case where it is possible to increase the transmitted electric power, the power transmission apparatus 402 transmits ACK as a response and increases the transmitted electric power. After that, the power reception apparatus 401 and the power transmission apparatus 402 repeat steps F511 to F513 to increase the transmitted electric power. Since the second reference received electric power information is the received electric power information obtained when the transmitted electric power by the power transmission apparatus 402 is 5 W, when, in step F514, the power transmission apparatus 402 has received a request for electric power increase exceeding 5 W from the power reception apparatus 401, in step F515, the power transmission apparatus 402 transmits NAK as a response to the power transmission output change instruction. This prevents electric power greater than or equal to a predefined value from being transmitted.

In response to receiving NAK from the power transmission apparatus 402, the power reception apparatus 401 recognizes that the transmitted electric power has reached the predefined electric power. Then, in step F516, the power reception apparatus 401 transmits, to the power transmission apparatus 402, information (second reference received electric power information) including received electric power in the load connected state while storing such information in the RP2. In step F517, the power transmission apparatus 402 becomes able to calculate power losses between the power transmission apparatus 402 and the power reception apparatus 401 in the load disconnected state and the load connected state based on the transmitted electric power value by the power transmission apparatus 402 and the received electric power values included in the first reference received electric power information and the second reference received electric power information. Moreover, by performing interpolation between those power losses, the power transmission apparatus 402 is able to calculate power loss values between the power transmission apparatus 402 and the power reception apparatus 401 in all of the transmitted electric power values (in this case, 250 mW to 5 W) which the power transmission apparatus 402 is able to take. In step F518, the power transmission apparatus 402 transmits ACK with respect to the second reference received electric power information received from the power reception apparatus 401, and then completes the calibration processing.

When the power transmission apparatus 402, having determined that it is possible to start charging processing, starts power transmission processing to the power reception apparatus 401, the power transmission apparatus 402 and the power reception apparatus 401 transition to the Power Transfer phase, so that charging for the power reception apparatus 401 is started.

Furthermore, before starting of power transmission processing, in step F519, the power transmission apparatus 402 and the power reception apparatus 401 can perform device authentication processing, and, in a case where it is determined that the mutual devices are compatible with a larger value of GP, in step F520, the power transmission apparatus 402 can re-set the GP to a larger value, for example, 15 W.

In this case, to increase the transmitted electric power by the power transmission apparatus 402 to 15 W, in steps F521 to F524, the power reception apparatus 401 and the power transmission apparatus 402 perform processing operations similar to the processing operations in steps F511 to F515. Then, the power transmission apparatus 402 and the power reception apparatus 401 perform calibration processing again with respect to GP=15 W. Specifically, in step F525, the power reception apparatus 401 transmits information (third reference received electric power information) including received electric power in the load connected state of the power reception apparatus 401 for the time when the transmitted electric power by the power transmission apparatus 402 is 15 W. In step F526, the power transmission apparatus 402 calculates power losses between the power transmission apparatus 402 and the power reception apparatus 401 in all of the transmitted electric power values (250 mW to 15 W) which the power transmission apparatus 402 is able to take, based on the received electric power values included in the first reference received electric power information, the second reference received electric power information, and the third reference received electric power information. Then, in step F527, the power transmission apparatus 402 transmits ACK with respect to the third reference received electric power information received from the power reception apparatus 401, thus completing the calibration processing. In step F528, the power transmission apparatus 402, having determined that it is possible to start charging processing, starts power transmission processing with respect to the power reception apparatus 401, thus transitioning to the Power Transfer phase.

In the Power Transfer phase, the power transmission apparatus 402 performs power transmission to the power reception apparatus 401. Moreover, the power transmission apparatus 402 performs foreign object detection by the power loss method. In the power loss method, first, the power transmission apparatus 402 calculates, by the above-mentioned calibration processing, a power loss $P_{loss}3$ between the power transmission apparatus 402 and the power reception apparatus 401 obtained in a state in which no foreign object exists, based on a difference between the transmitted electric power by the power transmission apparatus 402 and the received electric power by the power reception apparatus 401. The calculated value is equivalent to a reference power loss obtained in a normal state during power transmission processing (a state in which no foreign object exists). Then, in a case where a power loss $P_{loss}3'$ between the power transmission apparatus 402 and the power reception apparatus 401 measured during power transmission after calibration processing is away from the power loss obtained in the normal state by greater than or equal to a threshold value, the power transmission apparatus 402 determines that "a foreign object exists".

Thus far is the description of the power loss method. The power loss method is a method of performing foreign object detection based on a result of measurement of a power loss during power transmission from the power transmission apparatus 402 to the power reception apparatus 401. Foreign object detection by the power loss method has the demerit that, when the power transmission apparatus 402 is transmitting large electric power, the accuracy of foreign object detection decreases, but has the merit that, since it is possible to perform foreign object detection while continuing power transmission, the efficiency of electric power transmission can be maintained high.

In this way, during the Power Transfer phase, it is possible to perform foreign object detection by the power loss method. However, the mere foreign object detection by the power loss method has the possibility of false detection of a foreign object or the possibility of such an erroneous determination that, even though there is a foreign object, it is determined that no foreign object exists. Particularly, the Power Transfer phase is a phase in which the power transmission apparatus 402 performs electric power transmission, and, if a foreign object exists near the power transmission apparatus 402 and the power reception apparatus 401 during power transmission, for example, heat generated from the foreign object becomes larger. Therefore, it is requested to increase the accuracy of foreign object detection in this phase. Accordingly, to increase the accuracy of foreign object detection, the present example embodiment implements the waveform attenuation method as a foreign object detection method different from the power loss method.

[Foreign Object Detection Method Using Waveform Attenuation Method]

Figure 6:
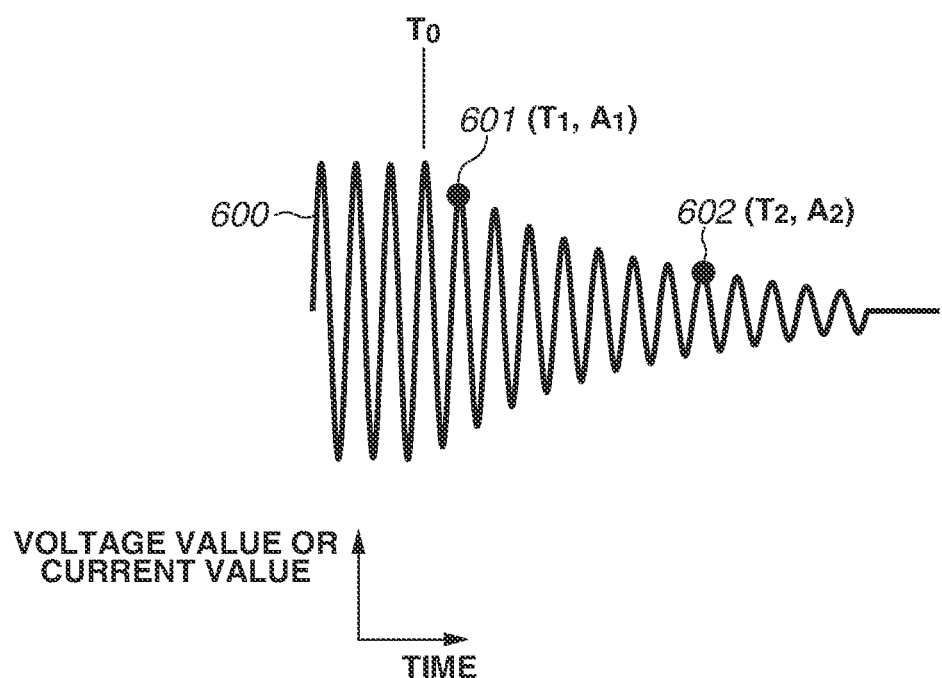
FIG. 6 is a diagram used to explain the principle of foreign object detection using a waveform attenuation method.

In the Power Transfer phase, the power transmission apparatus 402 performs electric power transmission with respect to the power reception apparatus 401. Therefore, if it is possible to perform foreign object detection using a power transmission waveform (the waveform of a voltage or the waveform of a current) related to this power transmission, foreign object detection becomes possible without the use of, for example, a newly defined signal for foreign object detection. In the following description, a method of performing foreign object detection based on the attenuation state of a power transmission waveform (waveform attenuation method) is described with reference to FIG. 6. FIG. 6 is a diagram used to explain a principle of foreign object detection using the waveform attenuation method. Here, an example of foreign object detection using a power transmission waveform related to power transmission from the power transmission apparatus 402 to the power reception apparatus 401 is described.

In FIG. 6, the waveform represents a change over time of a voltage value 600 (hereinafter referred to simply as a "voltage value") of a high-frequency voltage which is applied to the power transmission antenna 105 of the power transmission apparatus 402. The horizontal axis in FIG. 6 denotes time and the vertical axis denotes a voltage value. The power transmission apparatus 402 is assumed to be performing power transmission to the power reception apparatus 401 via the power transmission antenna 105 and stop power transmission at time $T_0$. Thus, at time $T_0$, the supply of electric power for power transmission from the power source unit 102 is stopped. The frequency of a power transmission waveform related to power transmission from the power transmission apparatus 402 is a predetermined frequency and is, for example, a fixed frequency between 85 kilohertz (kHz) to 205 kHz which is used in the WPC standard. Point 601 is a point on an envelope of the high-frequency voltage, and represents a voltage value obtained at time $T_1$. Coordinates $(T_1, A_1)$ at the point 601 indicate that the voltage value at time $T_1$ is a value $A_1$. Similarly, point 602 is also a point on an envelope of the high-frequency voltage, and represents a voltage value obtained at time $T_2$. Coordinates $(T_2, A_2)$ at the point 602 indicate that the voltage value at time $T_2$ is a value $A_2$. This quality factor (Q value or Q-Factor) of the power transmission antenna 105 is able to be obtained based on a temporal change of the voltage value occurring since the time $T_0$. For example, the Q value is calculated by formula (1) based on the time and voltage values at the points 601 and 602 on an envelope of the voltage value and the frequency f of the high-frequency voltage.

$$Q=\pi f(T_2-T_1)/\ln(A_1/A_2) \qquad (1)$$

In a case where a foreign object exists near the power transmission apparatus 402 and the power reception apparatus 401, the Q value decreases. This is because, in a case where a foreign object exists, a loss of energy occurs due to the foreign object. Therefore, focusing on the inclination of attenuation of the voltage value, when a foreign object exists, since a loss of energy caused by a foreign object occurs more frequently than when no foreign object exists, the inclination of a straight line connecting the point 601 and the point 602 becomes steeper and the attenuation rate of amplitude of the waveform becomes higher. Thus, the waveform attenuation method is a method of determining the presence or absence of a foreign object based on the attenuation state of voltage values between the point 601 and the point 602, and, in actually determining the presence or absence of a foreign object, such a determination can be performed by comparing some sort of numerical values representing the attenuation state. For example, the determination can be performed with use of the above-mentioned Q value.

The Q value becoming lower means the waveform attenuation rate (the degree of decrease of amplitude of the waveform per unit time) becoming higher. Alternatively, the determination can be performed with use of the inclination of a straight line connecting the point 601 and the point 602 which is obtained from "$(A_1/A_2)/(T_2-T_1)$". Alternatively, if the times ($T_1$ and $T_2$) at which to observe the attenuation state of voltage values are fixed, the determination can be performed with use of the value of $(A_1-A_2)$ representing a difference between voltage values or the value of $(A_1/A_2)$ representing a ratio between voltage values. Alternatively, if the voltage value $A_1$ obtained immediately after power transmission is stopped is fixed, the determination can be performed with use of the voltage value $A_2$ obtained after the elapse of a predetermined time. Alternatively, the determination can be performed with use of the value of a time $(T_2-T_1)$ taken until the voltage value $A_1$ becomes the predetermined voltage value $A_2$.

As described above, it is possible to determine the presence or absence of a foreign object based on the attenuation state of voltage values during the period of stopping of power transmission, and there is a plurality of values representing the attenuation state. In the present example embodiment, these values representing the attenuation state are referred to as "waveform attenuation indices". For example, as mentioned above, the Q value calculated by formula (1) is a value representing the attenuation state of voltage values related to power transmission and is thus included in the "waveform attenuation indices". Each of the waveform attenuation indices is a value corresponding to the waveform attenuation rate. Furthermore, in the waveform attenuation method, the waveform attenuation rate itself can be measured as a "waveform attenuation index". While, in the following description, a case where the waveform attenuation rate is used as a waveform attenuation index is mainly described, the content of the present example embodiment can also be applied to a case where another type of waveform attenuation index is used.

Furthermore, even if the vertical axis in FIG. 6 is assumed to denote a current value flowing through the power transmission antenna 105, as with the case of a voltage value, the attenuation state of current values during the period of stopping of power transmission changes depending on the presence or absence of a foreign object. Then, when a foreign object exists, the waveform attenuation rate becomes higher than when no foreign object exists. Therefore, even if the above-described method is applied to a temporal change of the current value flowing through the power transmission antenna 105, it is possible to detect a foreign object. Thus, it is possible to determine the presence or absence of a foreign object for foreign object detection by using, as waveform attenuation indices, for example, the Q value which is obtained from current waveforms, the inclination of attenuation of current values, a difference between current values, a ratio between current values, absolute values of current values, and the time taken until reaching of a predetermined current value. In this way, the waveform attenuation method is assumed to be a method of performing foreign object detection by measuring voltage or current values obtained in at least two time points in a predetermined period in which the power transmission apparatus 402 limits power transmission. Furthermore, measured values in three or more time points can also be used.

Moreover, foreign object detection that is based on both the attenuation state of voltage values and the attenuation state of current values, such as determining the presence or absence of a foreign object with use of an evaluation value calculated from a waveform attenuation index for voltage values and a waveform attenuation index for current values, can be performed. Furthermore, while, in the above-described example, the power transmission apparatus 402 measures the waveform attenuation index in a period in which the power transmission apparatus 402 has temporarily stopped power transmission, the power transmission apparatus 402 can be configured to measure the waveform attenuation index in a period in which the power transmission apparatus 402 has temporarily decreased electric power which is supplied from the power source unit 102 from a predetermined electric power level to an electric power level lower than the predetermined electric power level.

Figure 7:
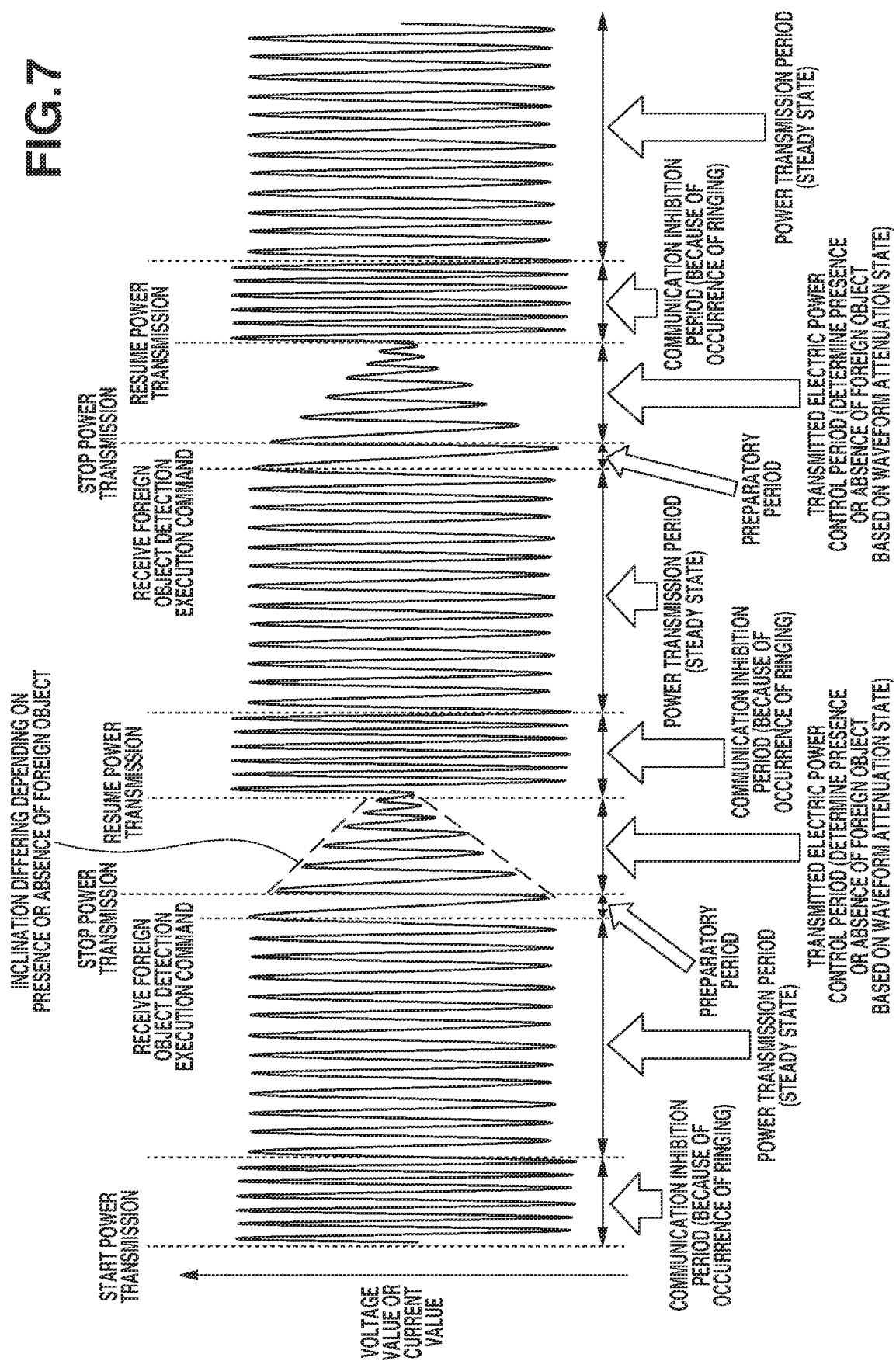
FIG. 7 is a diagram used to explain respective periods in performing foreign object detection using the waveform attenuation method.

Subsequently, a method of performing foreign object detection based on power transmission waveforms in the process of power transmission by the waveform attenuation method is described with reference to FIG. 7. FIG. 7 illustrates power transmission waveforms obtained at the time of performing foreign object detection by the waveform attenuation method, and, in FIG. 7, the horizontal axis denotes time and the vertical axis denotes a voltage value of the power transmission antenna 105. Furthermore, as with FIG. 6, the vertical axis can denote a current value of the current flowing through the power transmission antenna 105.

In a transient response period immediately after the power transmission apparatus 402 starts power transmission, the power transmission waveform does not become stable. Therefore, during the transient response period in which the power transmission waveform does not become stable, the power reception apparatus 401 performs control in such a way as not to perform communication (communication using amplitude modulation or load modulation) to the power transmission apparatus 402. Moreover, the power transmission apparatus 402 also performs control in such a way as not to perform communication (communication using frequency-shift keying) to the power reception apparatus 401. Hereinafter, this period is referred to as a "communication inhibition period". Furthermore, even during the communication inhibition period, the power transmission apparatus 402 performs power transmission to the power reception apparatus 401. Then, even after the elapse of the communication inhibition period, the power transmission apparatus 402 continues to perform power transmission to the power reception apparatus 401. Hereinafter, this period in the steady state is referred to as a "power transmission period".

Upon receiving a foreign object detection execution request packet (command) from the power reception apparatus 401, the power transmission apparatus 402 temporarily stops power transmission after the elapse of a predetermined period. Alternatively, the power transmission apparatus 402 temporarily decreases transmitted electric power.

Hereinafter, this predetermined period is referred to as a "preparatory period". Furthermore, the foreign object detection execution request packet can be the above-mentioned RP0, RP1, or RP2. Then, the power transmission control unit 302 of the power transmission apparatus 402 stops power transmission or temporarily decreases transmitted electric power after the elapse of the preparatory period. With this control, the amplitude of the power transmission waveform attenuates. Hereinafter, a period from when the power transmission apparatus 402 temporarily stops or temporarily decreases transmitted electric power to when the power transmission apparatus 402 resumes power transmission is referred to as a "transmitted electric power control period". The power transmission apparatus 402 calculates a waveform attenuation index of the attenuated waveform, compares the calculated waveform attenuation index with a threshold value, and thus determines the presence or absence of a foreign object or the possibility of a foreign object existing (existence probability). This determination can be performed during the transmitted electric power control period or can be performed in the communication inhibition period or the power transmission period.

In a case where, after the elapse of the transmitted electric power control period, no foreign object has been detected, the power transmission apparatus 402 resumes power transmission. Since, in the transient response period immediately after power transmission is resumed, the power transmission waveform does not become stable, the power transmission apparatus 402 transitions to the communication inhibition period again. Then, the power transmission apparatus 402 transitions to the power transmission period, in which to stably perform power transmission from the power transmission apparatus 402 to the power reception apparatus 401.

As described above, the power transmission apparatus 402 repeatedly performs starting of power transmission and stopping of power transmission while passing through the communication inhibition period, the power transmission period, the preparatory period, and the transmitted electric power control period. Then, the power transmission apparatus 402 calculates a waveform attenuation index of the attenuated waveform, compares the calculated waveform attenuation index with a threshold value, and thus determines the presence or absence of a foreign object or the possibility of a foreign object existing (existence probability).

Furthermore, if, in the transmitted electric power control period, elements such as the power reception unit 203, the charging unit 206, and the battery 207 are connected to the power reception antenna 205 and the resonance capacitor 211 of the power reception apparatus 401, the waveform attenuation index may be affected by loads caused by these elements. Thus, depending on the states of the power reception unit 203, the charging unit 206, and the battery 207, the waveform attenuation index may change. Therefore, even if the waveform attenuation index is large, it may become difficult to discriminate whether that is a result of being affected by a foreign object or is a result of being affected by a change of the states of, for example, the power reception unit 203, the charging unit 206, and the battery 207.

Accordingly, in the case of performing foreign object detection by observing the waveform attenuation index, the power reception apparatus 401 can disconnect the first switch unit 209 during the above-mentioned preparatory period. This enables removing the influence of the battery 207. Alternatively, the power reception apparatus 401 can turn on the second switch unit 210 to be short-circuited and bring about a state in which a current flows through a closed loop formed by the power reception antenna 205, the resonance capacitor 211, and the second switch unit 210. This enables removing the influences of the power reception unit 203, the charging unit 206, and the battery 207, and performing foreign object detection based on the waveform attenuation index for waves observed in such states enables high-accuracy foreign object detection.

Moreover, in a state, during the above-mentioned preparatory period, the power reception apparatus 401 turns on the first switch unit 209 to be short-circuited and turns off the second switch unit 210 to be disconnected, the power reception apparatus 401 can perform control in such a way as to transition to a low power consumption mode or to make power consumption constant. In a case where electric power which is consumed by the power reception apparatus 401 is not constant or large electric power is consumed, the waveform attenuation index for attenuated waves is affected by such a variation of power consumption. Accordingly, to remove such influences, the power reception apparatus 401 controls electric power which is consumed by the power reception apparatus 401. Specifically, for example, the power reception apparatus 401 limits or stops operations of applications which run in the power reception apparatus 401, or brings hardware functions included in the power reception apparatus 401 into a low power consumption mode or into an operation stopped mode. Performing foreign object detection based on the waveform attenuation index for waves observed in such states enables high-accuracy foreign object detection.

Moreover, similarly, during the above-mentioned preparatory period, the power transmission apparatus 402 can turn on the switch 108 to be short-circuited in such a way as to bring about a state in which a current flows through a closed loop formed by the power transmission antenna 105, the resonance capacitor 107, and the switch 108. This enables removing the influences of the power source unit 102, the power transmission unit 103, and the communication unit 104. Alternatively, a switch (not illustrated) can be provided between the power transmission antenna 105 and the power transmission unit 103, and the power transmission apparatus 402 can disconnect the provided switch during the above-mentioned preparatory period, thus removing the influences of the power source unit 102, the power transmission unit 103, and the communication unit 104.

[Determination Method for Each Period in Case of Using Waveform Attenuation Method as Foreign Object Detection Method]

Next, a determination method for the above-mentioned preparatory period is described. The determination method for the preparatory period can be a method of using a preliminarily determined fixed value (time). Moreover, the determination method for the preparatory period can be a method in which the power transmission apparatus 402 determines a time according to the state of the power transmission apparatus 402 and notifies the power reception apparatus 401 of the determined time. Alternatively, the determination method for the preparatory period can be a method in which the power reception apparatus 401 determines a time according to the state of the power reception apparatus 401 and notifies the power transmission apparatus 402 of the determined time.

Moreover, as another determination method, the power transmission apparatus 402 and the power reception apparatus 401 can determine a time by communicating with each other and exchanging respective pieces of information with each other. For example, the power transmission apparatus 402 determines a maximum time of the preparatory period and notifies the power reception apparatus 401 of the determined maximum time, and the power reception apparatus 401 determines a minimum time of the preparatory period and notifies the power transmission apparatus 402 of the determined minimum time. Then, the power reception apparatus 401 can determine the preparatory period with a value (time) included in the range set by the power transmission apparatus 402 and the power reception apparatus 401 and notify the power transmission apparatus 402 of the determined value. Moreover, this relationship between the power transmission apparatus 402 and the power reception apparatus 401 can be reversed. Determining the preparatory period as an appropriate time enables preventing waveforms in the transmitted electric power control period from being disturbed.

Next, a determination method for the above-mentioned transmitted electric power control period is described. In the determination method for the transmitted electric power control period, it is important to determine a transmitted electric power control period with which both the power transmission apparatus 402 and the power reception apparatus 401 are compatible. Therefore, in the Negotiation phase, the power transmission apparatus 402 and the power reception apparatus 401 mutually communicate capabilities concerning respective transmitted electric power control periods with which the power transmission apparatus 402 and the power reception apparatus 401 are compatible and thus determine an actual transmitted electric power control period from within a common range for both apparatuses.

Specifically, the determination method is implemented by two types of commands which are issued by the power reception apparatus 401.

As the first type of command, a command for acquiring information about a minimum value of the transmitted electric power control period (hereinafter referred to as a "transmitted electric power control minimum period) which is able to be generated by the power transmission apparatus 402 (hereinafter referred to as a "transmitted electric power control minimum period request command") is issued by the power reception apparatus 401. Here, the transmitted electric power control minimum period which is able to be generated by the power transmission apparatus 402 is assumed to include at least a period required for the power transmission apparatus 402 to perform foreign object detection by the waveform attenuation method. As the second type of command, a command for acquiring information about a maximum value of the transmitted electric power control period (hereinafter referred to as a "transmitted electric power control maximum period) with which the power reception apparatus 401 is compatible (hereinafter referred to as a "transmitted electric power control maximum period notification command") is issued by the power reception apparatus 401. Here, the transmitted electric power control maximum period with which the power reception apparatus 401 is compatible is set within a range for which it is not determined that power transmission has been stopped.

With use of such two commands, the power reception apparatus 401 and the power transmission apparatus 402 are able to recognize each other's capabilities concerning the transmitted electric power control period. Then, in a condition of "(the transmitted electric power control minimum period which is able to be generated by the power transmission apparatus 402)≤(the transmitted electric power control maximum period with which the power reception apparatus 401 is compatible)" is satisfied, the power transmission apparatus 402 and the power reception apparatus 401 are able to determine a transmitted electric power control period from within such a range. Moreover, in the above-mentioned exchange of information, in a case where, for example, it is not desired to perform foreign object detection by the waveform attenuation method, setting the value of a transmitted electric power control minimum period or transmitted electric power control maximum period which is set in the RP packet to "0" enables communicating an intention not to perform foreign object detection by the waveform attenuation method.

Here, a relationship between transmitted electric power, which is transmitted from the power transmission apparatus 402, and a transmitted electric power control period is described. In exchange of information between the power transmission apparatus 402 and the power reception apparatus 401, in addition to the above-described method, the transmitted electric power control period is determined in such a manner that, as the transmitted electric power which is transmitted from the power transmission apparatus 402 is larger, the transmitted electric power control period becomes shorter. When power transmission is resumed after the elapse of the transmitted electric power control period, ringing occurs in power transmission waveforms at timing when power transmission is resumed. Since, as a difference between high and low levels of transmitted electric power before and after resumption of power transmission is larger, larger ringing occurs, it becomes necessary to reduce a difference between high and low levels of transmitted electric power before and after resumption of power transmission to make ringing smaller.

Since making the transmitted electric power control period shorter leads to resuming power transmission in a state in which waveform attenuation is small, a difference between high and low levels of transmitted electric power becomes smaller as a result, so that it becomes possible to prevent or reduce ringing.

In this way, making the transmitted electric power control period shorter as the transmitted electric power is larger enables reducing a difference between high and low levels of transmitted electric power at the time of resumption of power transmission, thus preventing or reducing ringing. On the other hand, conversely, making the transmitted electric power control period longer as the transmitted electric power is larger can be employed. Since larger transmitted electric power enables performing high-accuracy foreign object detection, when transmitted electric power is large, the transmitted electric power control period is made longer to observe the attenuation state for a long time. This enables implementing higher-accuracy foreign object detection than when transmitted electric power is small.

Next, a determination method for the above-mentioned communication inhibition period is described. Since, after resumption of power transmission, ringing occurs in power transmission waveforms, causing communication not to be performed in the ringing occurring state implements stable communication. The determination method for the communication inhibition period can be a method of using a preliminarily determined fixed value (time) as with the determination method for the preparatory period. Moreover, the determination method for the communication inhibition period can be a method in which the power transmission apparatus 402 determines a time according to the state of the power transmission apparatus 402 and notifies the power reception apparatus 401 of the determined time. Alternatively, the determination method for the communication inhibition period can be a method in which the power reception apparatus 401 determines a time according to the state of the power reception apparatus 401 and notifies the power transmission apparatus 402 of the determined time.

Moreover, as another determination method, the power transmission apparatus 402 and the power reception apparatus 401 can determine a time by communicating with each other and exchanging respective pieces of information with each other. For example, the power transmission apparatus 402 determines a maximum time of the communication inhibition period and notifies the power reception apparatus 401 of the determined maximum time, and the power reception apparatus 401 determines a minimum time of the communication inhibition period and notifies the power transmission apparatus 402 of the determined minimum time. Then, the power reception apparatus 401 can determine the communication inhibition period with a value (time) included in the range set by the power transmission apparatus 402 and the power reception apparatus 401 and notify the power transmission apparatus 402 of the determined value. Moreover, this relationship between the power transmission apparatus 402 and the power reception apparatus 401 can be reversed. In this case, from within the range set by the power transmission apparatus 402 and the power reception apparatus 401, the power transmission apparatus 402 or the power reception apparatus 401 can determine a minimum time as the communication inhibition period. Alternatively, from within the range set by the power transmission apparatus 402 and the power reception apparatus 401, the power transmission apparatus 402 or the power reception apparatus 401 can determine a maximum time as the communication inhibition period.

Here, a relationship between transmitted electric power, which is transmitted from the power transmission apparatus 402, and a communication inhibition period is described. In exchange of information between the power transmission apparatus 402 and the power reception apparatus 401, in addition to the above-described method, the communication inhibition period is determined in such a manner that, as the transmitted electric power which is transmitted from the power transmission apparatus 402 is larger, the communication inhibition period becomes longer. Since, as mentioned above, as a difference between high and low levels of transmitted electric power before and after resumption of power transmission is larger, ringing becomes larger, the communication inhibition period is provided longer in such a manner that ringing diminishes or becomes sufficiently small. This enables performing stable communication between the power transmission apparatus 402 and the power reception apparatus 401. Furthermore, conversely, a configuration in which, as transmitted electric power is larger, the communication inhibition period becomes shorter can be employed.

Next, a relations hip between the transmitted electric power control period and the communication inhibition period is described. In exchange of information between the power transmission apparatus 402 and the power reception apparatus 401, in addition to the above-described method, the communication inhibition period is determined in such a manner that, as the transmitted electric power control period is longer, the communication inhibition period becomes longer. Since, as mentioned above, as a difference between high and low levels of transmitted electric power before and after resumption of power transmission is larger, ringing becomes larger. Accordingly, since, when the transmitted electric power control period becomes longer, the attenuation of power transmission waveforms also becomes larger, as a result, a difference between high and low levels of transmitted electric power at the time of resumption of power transmission becomes larger and ringing also becomes larger. Therefore, making the communication inhibition period longer as the transmitted electric power control period is longer enables performing communication after ringing diminishes or becomes sufficiently small and thus performing stable communication between the power transmission apparatus 402 and the power reception apparatus 401. Furthermore, conversely, a configuration in which, as the transmitted electric power control period is longer, the communication inhibition period becomes shorter can be employed.

Next, a determination method for the above-mentioned power transmission period is described. The determination method for the power transmission period can be a method of using a preliminarily determined fixed value (time) as with the determination methods for the preparatory period and the communication inhibition period. Moreover, the determination method for the power transmission period can be a method in which the power transmission apparatus 402 determines a time according to the state of the power transmission apparatus 402 and notifies the power reception apparatus 401 of the determined time. Alternatively, the determination method for the power transmission period can be a method in which the power reception apparatus 401 determines a time according to the state of the power reception apparatus 401 and notifies the power transmission apparatus 402 of the determined time.

Moreover, as another determination method, the power transmission apparatus 402 and the power reception apparatus 401 can determine a time by communicating with each other and exchanging respective pieces of information with each other. For example, the power transmission apparatus 402 determines a maximum time of the power transmission period and notifies the power reception apparatus 401 of the determined maximum time, and the power reception apparatus 401 determines a minimum time of the power transmission period and notifies the power transmission apparatus 402 of the determined minimum time. Then, the power reception apparatus 401 can determine the power transmission period with a value (time) included in the range set by the power transmission apparatus 402 and the power reception apparatus 401 and notify the power transmission apparatus 402 of the determined value. Moreover, this relationship between the power transmission apparatus 402 and the power reception apparatus 401 can be reversed.

Here, a relationship between transmitted electric power, which is transmitted from the power transmission apparatus 402, and a power transmission period is described. In exchange of information between the power transmission apparatus 402 and the power reception apparatus 401, in addition to the above-described method, the power transmission period is determined in such a manner that, as the transmitted electric power which is transmitted from the power transmission apparatus 402 is larger, the power transmission period becomes shorter. As mentioned above, the transmitted electric power is larger, higher-accuracy foreign object detection is requested. Therefore, making the power transmission period shorter as the transmitted electric power is larger is used to increase the number of times of the transmitted electric power control period within a predetermined period. This enables increasing the number of times of observing the waveform attenuation to increase the opportunity of performing foreign object detection and thus enables higher-accuracy foreign object detection. On the other hand, conversely, a configuration in which, as the transmitted electric power is larger, the power transmission period becomes longer can be employed. This enables performing power transmission without decreasing the transmission efficiency of transmitted electric power from the power transmission apparatus 402 to the power reception apparatus 401.

[Setting Method for Threshold Value Concerning Foreign Object Detection in Waveform Attenuation Method]

Next, a setting method for a threshold value used for determining the presence or absence of a foreign object or the probability of a foreign object existing (existence probability) in performing foreign object detection by the waveform attenuation method is described. As mentioned above, the waveform attenuation method performs foreign object detection based on a waveform attenuation index. Thus, the waveform attenuation method compares the measured waveform attenuation index with a predetermined threshold value and, based on a result of the comparison, determines the presence or absence of a foreign object or the probability of a foreign object existing. The setting method for the threshold value includes the following methods.

First, the first is a method in which the power transmission apparatus 402 stores, as a threshold value, a preliminarily determined fixed value, which serves as a common value not depending on the power reception apparatus 401 targeted for power transmission. Furthermore, the fixed value can be one and the same value even in any case or can be a value which the power transmission apparatus 402 determines depending on the situation. As mentioned above, with regard to power transmission waveforms occurring during the transmitted electric power control period, if a foreign object exists, the waveform attenuation rate becomes higher. Therefore, the first method preliminarily stores, as a predetermined value, a waveform attenuation index obtained when it is considered that no foreign object exists, sets the stored predetermined value as a threshold value, and compares a result of the measured waveform attenuation index with the threshold value. If the measured waveform attenuation index is larger than the threshold value, the first method determines that a foreign object exists or the probability of a foreign object existing is high.

For example, in a case where the waveform attenuation index is set as a Q value, the first method compares a Q value measured by the power transmission apparatus 402 with a Q value (threshold value) obtained when it is considered that a predetermined foreign object does not exist. Then, if the measured Q value is smaller than the threshold value, the first method determines that a foreign object exists or there is a probability of a foreign object existing. Moreover, if the measured Q value is larger than or almost equal to the threshold value, the first method determines that no foreign object exists or the probability of a foreign object existing is low. Using the first method as mentioned above enables foreign object detection by the waveform attenuation method.

The second is a method in which, based on information transmitted from the power reception apparatus 401, the setting unit 304 of the power transmission apparatus 402 adjusts a threshold value to determine a final threshold value. As with the first method, the second method preliminarily stores, as a predetermined value, a waveform attenuation index obtained when it is considered that no foreign object exists, sets the stored predetermined value as a threshold value, and compares a result of the measured waveform attenuation index with the threshold value. If the measured waveform attenuation index is larger than the threshold value, the second method determines that a foreign object exists or the probability of a foreign object existing is high. Here, the value of the measured waveform attenuation index may differ depending on the power reception apparatus 401 targeted for power transmission, which is placed on the power transmission apparatus 402. This is because the electrical characteristics of the power reception apparatus 401, which couples to the power transmission apparatus 402 via the power transmission antenna 105 of the power transmission apparatus 402, affect the value of the waveform attenuation index.

For example, in a case where the waveform attenuation index is set as a Q value, a Q value measured by the power transmission apparatus 402 when no foreign object exists may differ depending on the power reception apparatus 401 placed on the power transmission apparatus 402. Therefore, the power reception apparatus 401 previously retains, with respect to each power transmission apparatus 402, information about a Q value obtained when the power reception apparatus 401 has been placed on the power transmission apparatus 402 in a state in which no foreign object exists, and communicates the stored Q value to the power transmission apparatus 402 as a notification. Then, the power transmission apparatus 402 adjusts the threshold value based on information about the Q value received from the power reception apparatus 401, thus determining a final threshold value.

As mentioned above, in the Negotiation phase, the power transmission apparatus 402 receives FOD Status Packet in which information about Reference Quality Factor Value is stored, and adjusts a threshold value in the Q value measuring method. Then, the power transmission apparatus 402 determines a final threshold value in the Q value measuring method. Therefore, with regard to a threshold value in foreign object detection by the waveform attenuation method, similarly, the power transmission apparatus 402 adjusts a threshold value based on the Reference Quality Factor Value, thus determining a final threshold value.

Furthermore, in the Negotiation phase, Reference Quality Factor Value, which is transmitted from the power reception apparatus 401 to the power transmission apparatus 402, is originally information used for foreign object detection in the Q value measuring method, which measured a Q value in a frequency domain. On the other hand, in the case of setting the waveform attenuation index as a Q value, although a derivation method for a Q value is different, even the waveform attenuation method, which measures a Q value in a time domain, is able to obtain a Q value by the above-mentioned formula (1) from, for example, the waveform illustrated in FIG. 6. Therefore, it is possible to set a threshold value for a Q value in the waveform attenuation method based on Reference Quality Factor Value. In this way, in the Negotiation phase, the power transmission apparatus 402 setting a threshold value for a Q value in the waveform attenuation method based on information already transmitted from the power reception apparatus 401 to the power transmission apparatus 402 makes processing such as new measurement for threshold value setting unnecessary. Therefore, it becomes possible to set a threshold value in a shorter amount of time.

The second method compares a Q value measured by the power transmission apparatus 402 with the threshold value determined by the above-mentioned method, and, if the measured Q value is smaller than the threshold value, the second method determines that a foreign object exists or there is a probability of a foreign object existing.

On the other hand, if the measured Q value is larger than or almost equal to the threshold value, the second method determines that no foreign object exists or the probability of a foreign object existing is low. Using the second method as mentioned above enables foreign object detection by the waveform attenuation method.

The third is a method in which the measurement unit 303 of the power transmission apparatus 402 measures the waveform attenuation index in a state in which no foreign object exists, and, based on information about a result of the measurement, the setting unit 304 of the power transmission apparatus 402 adjusts a threshold value to determine a final threshold value. The value of the waveform attenuation index may differ depending on transmitted electric power by the power transmission apparatus 402. This is because, for example, the amount of heat generation and various characteristics of electrical circuits of the power transmission apparatus 402 vary due to the large or small amount of transmitted electric power by the power transmission apparatus 402 and such variations affect the value of the waveform attenuation index. Therefore, the power transmission apparatus 402 measuring a waveform attenuation index for each transmitted electric power value and, based on a result of the measurement, adjusting a threshold value to determine a final threshold value enables higher-accuracy foreign object detection.

Figure 9:
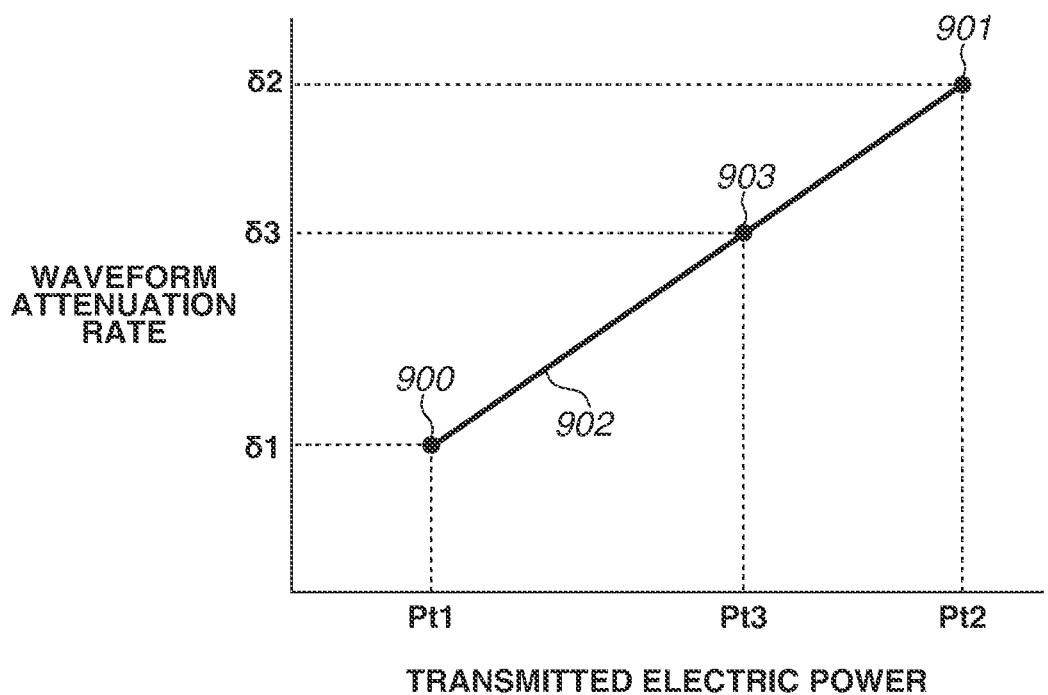
FIG. 9 is a diagram used to explain a waveform attenuation rate corresponding to transmitted electric power.

FIG. 9 is a diagram used to explain a setting method for a threshold value concerning foreign object detection for each transmitted electric power value by the power transmission apparatus 402 in the waveform attenuation method. First, the power reception apparatus 401 performs control to bring about a light load state in which, when power transmission from the power transmission apparatus 402 is performed, no electric power is suppled or only very small electric power is supplied to a load of the power reception apparatus 401. The transmitted electric power by the power transmission apparatus 402 obtained at this time is denoted by Pt1. Then, the power transmission apparatus 402 stops power transmission in that state and measures a waveform attenuation index. The waveform attenuation index obtained at this time is denoted by $\delta 1$. At this time, the power transmission apparatus 402 recognizes transmitted electric power Pt1 which the power transmission apparatus 402 is transmitting, and stores, in the memory 106, a calibration point 900 which associates the transmitted electric power Pt1 and the waveform attenuation index $\delta 1$ with each other.

Next, the power reception apparatus 401 performs control to bring about a load connected state in which, when power transmission from the power transmission apparatus 402 is performed, maximum electric power is supplied or electric power larger than or equal to a predetermined threshold value is sullied to a load of the power reception apparatus 401. The transmitted electric power by the power transmission apparatus 402 obtained at this time is denoted by Pt2. Then, the power transmission apparatus 402 stops power transmission in that state and measures a waveform attenuation index. The waveform attenuation index obtained at this time is denoted by $\delta 2$. At this time, the power transmission apparatus 402 stores, in the memory 106, a calibration point 901 which associates the transmitted electric power Pt2 and the waveform attenuation index $\delta 2$ with each other.

Subsequently, the power transmission apparatus 402 creates a straight line 902 which is linearly interpolated between the calibration point 900 and the calibration point 901. The straight line 902 represents a relationship between the transmitted electric power and the waveform attenuation index of the power transmission waveform occurring in a state in which no foreign object exists near the power transmission apparatus 402 and the power reception apparatus 401. This enables the power transmission apparatus 402 to estimate, from the straight line 902, a waveform attenuation index of the power transmission waveform for each transmitted electric power value obtained in a state in which no foreign object exists. For example, in a case where the transmitted electric power value is Pt3, the power transmission apparatus 402 is able to estimate that the waveform attenuation index is $\delta 3$, based on a point 903 on the straight line 902 corresponding to the transmitted electric power Pt3. Then, based on a result of the estimation, the power transmission apparatus 402 is able to calculate a threshold value used for determining the presence or absence of a foreign object with respect to each transmitted electric power value.

For example, based on a result of estimation of a waveform attenuation index in a case where no object exists with respect to a given transmitted electric power value, the power transmission apparatus 402 can estimate, as a threshold value for determining the presence or absence of a foreign object, a waveform attenuation index larger by a value corresponding to a measurement error. Calibration processing which the power transmission apparatus 402 and the power reception apparatus 401 perform to cause the power transmission apparatus 402 to acquire a combination of the transmitted electric power value and the waveform attenuation index is hereinafter referred to as "calibration processing (CAL processing) for a waveform attenuation index". Furthermore, while, in the above-mentioned example, the power transmission apparatus 402 performs measurement at two pints of the transmitted electric power values Pt1 and Pt2, to more increase accuracy, the power transmission apparatus 402 can perform measurement at three or more points to calculate a waveform attenuation index for each transmitted electric power value.

Furthermore, the power reception apparatus 401 can perform both a control operation which brings about a light load state in which no electric power is supplied to a load and a control operation which brings about a load connected state, after notifying the power transmission apparatus 402 of performing control. Moreover, whichever of the two control operations can be performed first.

Moreover, the above-described operation for calculating a threshold value used for determining the presence or absence of a foreign object for each load (for each transmitted electric power value) can be performed in the Calibration phase. As mentioned above, in the Calibration phase, the power transmission apparatus 402 acquires data required for performing foreign object detection by the power loss method. At that time, the power transmission apparatus 402 acquires data concerning a power loss in each of a case where the load state of the power reception apparatus 401 is a light load state and a case where the load state of the power reception apparatus 401 is a load connected state.

Therefore, the measurement of the calibration point 900 and the calibration point 901 illustrated in FIG. 9 can be performed concurrently with the above-mentioned measurement of a power less. In that case, when having received the first reference received electric power information from the power reception apparatus 401, the power transmission apparatus 402 performs, in addition to the above-mentioned processing to be performed in the Calibration phase, measurement of the calibration point 900.

Moreover, when having received the second reference received electric power information from the power reception apparatus 401, the power transmission apparatus 402 performs, in addition to the above-mentioned processing to be performed in the Calibration phase, measurement of the calibration point 901. This eliminates the need to separately provide periods for performing measurement of the calibration point 900 and the calibration point 901, so that it is possible to perform measurement of the calibration point 900 and the calibration point 901 in a shorter amount of time.

In this way, the power transmission apparatus 402 adjusts a threshold value for a waveform attenuation index in the waveform attenuation method for each transmitted electric power value, based on information about the waveform attenuation index measured with respect to each transmitted electric power value, thus determining a final threshold value. For example, in a case where the waveform attenuation index is set as a Q value, the power transmission apparatus 402 compares a Q value measured by the power transmission apparatus 402 with the threshold value determined by the above-mentioned method, and, if the measured Q value is smaller than the threshold value, the power transmission apparatus 402 determines that a foreign object exists or there is a probability of a foreign object existing. On the other hand, if the measured Q value is larger than or almost equal to the threshold value, the power transmission apparatus 402 determines that no foreign object exists or the probability of a foreign object existing is low. Performing control in the above-mentioned way enables setting a threshold value in each transmitted electric power value by the power transmission apparatus 402 and enables higher-accuracy foreign object detection.

[Basic Processing by Power Reception Apparatus 401 and Power Transmission Apparatus 402]

Figure 10A:
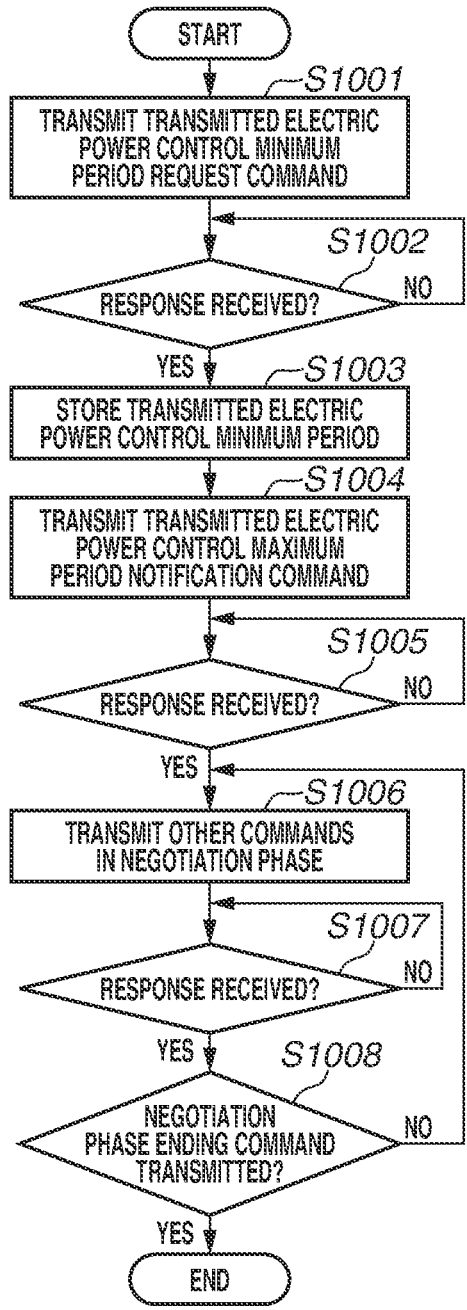
FIGS. 10A and 10B are flowcharts illustrating examples of basic processing procedures which are executed by the power reception apparatus to perform foreign object detection using the waveform attenuation method.
Figure 10B:
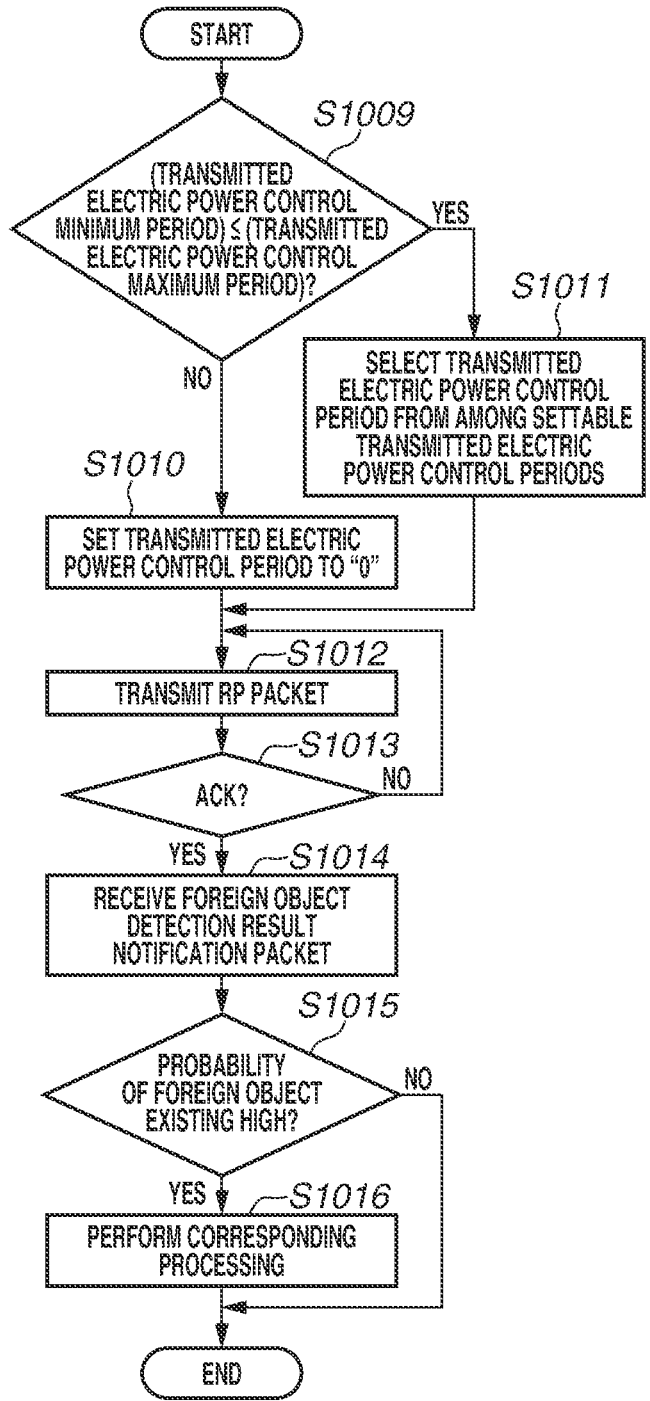
Figure 11A:
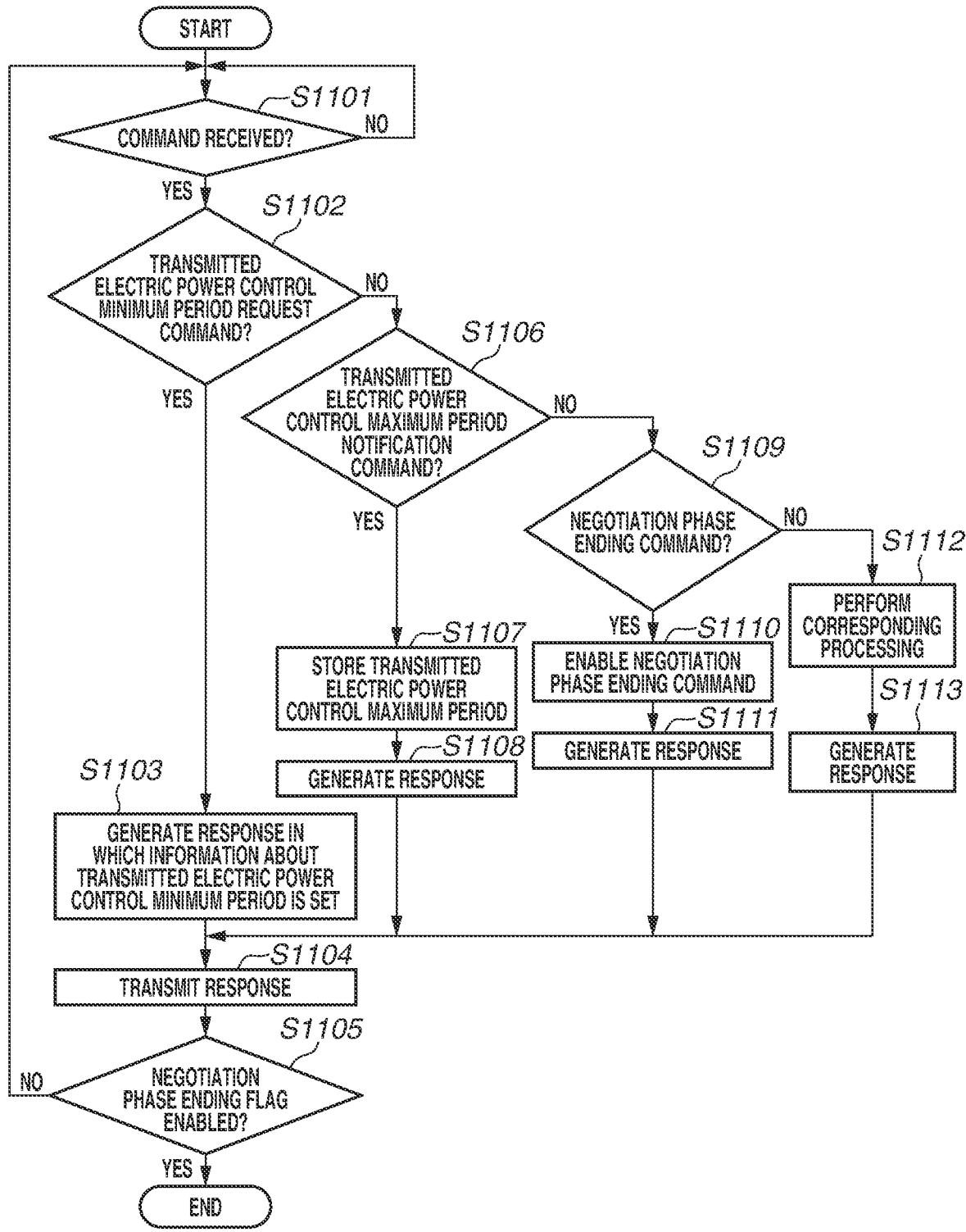
FIGS. 11A and 11B are flowcharts illustrating examples of basic processing procedures which are executed by the power transmission apparatus to perform foreign object detection using the waveform attenuation method.
Figure 11B:
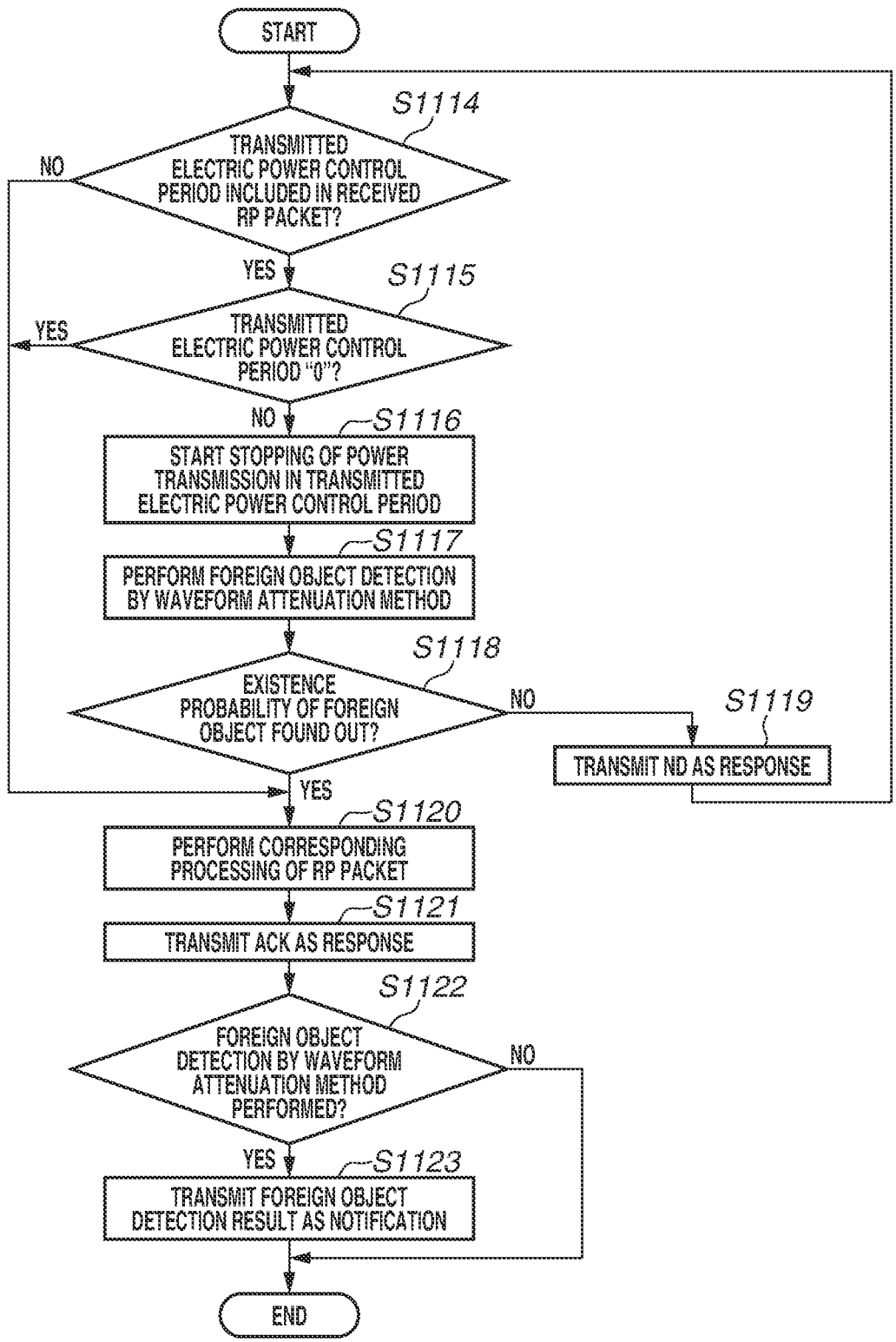

The flow of processing which is performed by the power reception apparatus 401 and the power transmission apparatus 402 to implement the above-described content is described with reference to flowcharts for the power reception apparatus 401 illustrated in FIGS. 10A and 10B and flowcharts for the power transmission apparatus 402 illustrated in FIGS. 11A and 11B. The flowcharts of FIG. 10A and FIG. 11A are flowcharts concerning processing for information exchange which is performed in the Negotiation phase to perform foreign object detection by the waveform attenuation method between the power transmission apparatus 402 and the power reception apparatus 401. Moreover, the flowcharts of FIG. 10B and FIG. 11B are flowcharts concerning processing for requesting foreign object detection by the waveform attenuation method with use of an RP packet.

FIG. 10A is a flowchart illustrating an example of a basic processing procedure in the Negotiation phase by a power reception apparatus ideal for performing foreign object detection by the waveform attenuation method. Furthermore, the present example embodiment is also applicable to a power reception apparatus which transmits a command for notification of ending of the Negotiation phase before transmitting a transmitted electric power control minimum period request command or a transmitted electric power control maximum period notification command. A processing procedure by such a power reception apparatus is described below with reference to FIG. 12 and FIG. 14.

First, in step S1001, the control unit 201 of the power reception apparatus 401 transmits a transmitted electric power control minimum period request command to the power transmission apparatus 402. Here, transmission processing for a command in the power reception apparatus 401 is able to be implemented by the control unit 201 transmitting a request command via the communication unit 204. Then, in step S1002, the control unit 201 waits until receiving a response from the power transmission apparatus 402. Reception of a response in the power reception apparatus 401 can also be implemented by the control unit 201 causing the communication unit 204 to perform polling or can also be implemented by a method of generating an interrupt from the communication unit 204 to the control unit 201. Moreover, the received response is transferred to and retained in the memory 208.

Upon receiving a response from the power transmission apparatus 402 (YES in step S1002), in step S1003, the control unit 201 stores information about a transmitted electric power control minimum period able to be generated by the power transmission apparatus 402 included in the response. In step S1004, the control unit 201 transmits a transmitted electric power control maximum period notification command to the power transmission apparatus 402. Then, in step S1005, the control unit 201 waits until receiving a response from the power transmission apparatus 402. Furthermore, implementation methods for these processing operations are similar to those in steps S1001 and S1002.

Here, examples of a setting method for a transmitted electric power control maximum period with which the power reception apparatus 401 is compatible include some methods. The transmitted electric power control maximum period is the maximum value of a transmitted electric power control period which is allowable by the power reception apparatus 401. This maximum value is a value which indicates that, in a case where power transmission has been temporarily stopped due to foreign object detection by the waveform attenuation method, if how long the period of such stopping is, it is not determined that power transmission has been stopped, and is a value which can vary depending on various conditions of the power reception apparatus 401.

As the first method, a method is conceivable which sets a preliminarily determined fixed value as a transmitted electric power control maximum period with which the power reception apparatus 401 is compatible. The method is able to set a value preliminarily determined based on specifications of modules involved in power reception, such as the power reception unit 203, the power reception antenna 205, the second switch unit 210, and the resonance capacitor 211.

Moreover, as the second method, a method is conceivable which sets a value calculated from the degree of dependence on a power source for power reception determined in consideration of an operation mode and power consumption of the power reception apparatus 401 as a transmitted electric power control maximum period with which the power reception apparatus 401 is compatible. For example, in the case of a situation in which the battery 207 is detached and the power reception apparatus 401 is operating with only electric power received by wireless electric power transmission, if the period in which power transmission is stopped becomes long, the power reception apparatus 401 may consume electric accumulated in the resonance capacitor 211 and result in loss of power. In this situation, if the operation mode of the power reception apparatus 401 is a high-load mode, the time in which electric power is lost from the resonance capacitor 211 in the transmitted electric power control period becomes shorter, so that the allowable transmitted electric power control period also necessarily becomes shorter. In a case where, in this way, the power reception apparatus 401 has a high degree of dependence on received electric power, the method selects as small a value as possible as the transmitted electric power control maximum period. Moreover, in a case where the degree of dependence on received electric power is not so high, such as a case where the battery 207 is attached and the amount of accumulated electric power also has plenty of room, to increase the certainty of foreign object detection by the waveform attenuation method, the method selects a large value as the transmitted electric power control maximum period. In this way, it is also possible to set the transmitted electric power control maximum period in view of the degree of dependence on received electric power determined in consideration of an operation mode and power consumption of the power reception apparatus 401.

Upon receiving a response from the power transmission apparatus 402 (YES in step S1005), in step S1006, the control unit 201 transmits other commands required in the Negotiation phase to the power transmission apparatus 402. Here, examples of the commands required in the Negotiation phase include a command concerning GP which the power reception apparatus 401 requests and a command which is required to perform foreign object detection using the Q value measuring method. Then, in step S1007, the control unit 201 waits until receiving a response to the transmitted commands.

Upon receiving a response from the power transmission apparatus 402 (YES in step S1007), in step S1008, the control unit 201 determines whether the command transmitted in step S1006 is a command which communicates ending of the Negotiation phase. If it is determined that the transmitted command is a command which communicates ending of the Negotiation phase (YES in step S1008), the control unit 201 ends the processing in the present flowchart. On the other hand, if not so (NO in step S1008), the control unit 201 returns the processing to step S1006, thus performing transmission of a next command required in the Negotiation phase.

FIG. 11A is a flowchart illustrating an example of a basic processing procedure of the power transmission apparatus 402 in the Negotiation phase. Furthermore, the processing illustrated in FIG. 11A is a processing procedure which is premised on that a transmitted electric power control minimum period request command and a transmitted electric power control maximum period notification command are transmitted from the power reception apparatus 401 and, after that, a command which communicates ending of the Negotiation phase is transmitted. While the power transmission apparatus 402 according to the present example embodiment is also able to cope with a case where, before a transmitted electric power control minimum period request command or a transmitted electric power control maximum period notification command is transmitted, a command which communicates ending of the Negotiation phase has been transmitted, a processing procedure for that case is described below. In FIG. 11A, basic processing which the power transmission apparatus 402 performs in the Negotiation phase to perform foreign object detection by the waveform attenuation method is described.

First, in step S1101, the power transmission apparatus 402 waits until receiving a command from the power reception apparatus 401. Reception of a command in the power transmission apparatus 402 can also be implemented by the control unit 101 causing the communication unit 104 to perform polling or can also be implemented by a method of generating an interrupt from the communication unit 104 to the control unit 101. Moreover, the received command is transferred to and retained in the memory 106.

Upon receiving a command from the power reception apparatus 401 (YES in step S1101), in step S1102, the power transmission apparatus 402 determines whether the received command is a transmitted electric power control minimum period request command. If it is determined that the received command is a transmitted electric power control minimum period request command (YES in step S1102), the power transmission apparatus 402 advances the processing to step S1103.

In step S1103, the power transmission apparatus 402 sets a transmitted electric power control minimum period which the power transmission apparatus 402 is able to generate, and generates a response including information about the transmitted electric power control minimum period. In this processing, the control unit 101 interprets a command retained in the memory 106 and thus generates a response corresponding to the interpreted command in the memory 106. The transmitted electric power control minimum period as set herein can be set as a fixed value adapted for the power transmission apparatus 402 or, as mentioned above, can be determined in view of the determination method for a transmitted electric power control period. For example, the power transmission apparatus 402 can be configured to set a transmitted electric power control minimum period which the power transmission apparatus 402 is able to generate, based on a relationship between the transmitted electric power, which is transmitted from the power transmission apparatus 402, and the transmitted electric power control period.

On the other hand, if, in step S1102, it is determined that the received command is not a transmitted electric power control minimum period request command (NO in step S1102), then in step S1106, the power transmission apparatus 402 determines whether the received command is a transmitted electric power control maximum period notification command. If it is determined that the received command is a transmitted electric power control maximum period notification command (YES in step S1106), the power transmission apparatus 402 advances the processing to step S1107.

In step S1107, the power transmission apparatus 402 acquires a transmitted electric power control maximum period from the received command, and stores information about the transmitted electric power control maximum period in the memory 106. Then, in step S1108, the power transmission apparatus 402 generates a response to the transmitted electric power control maximum period notification command.

On the other hand, if, in step S1106, it is determined that the received command is not a transmitted electric power control maximum period notification command (NO in step S1106), then in step S1109, the power transmission apparatus 402 determines whether the command received in step S1101 is a command for notification of ending of the Negotiation phase. If it is determined that the received command is a command for notification of ending of the Negotiation phase (YES in step S1109), the power transmission apparatus 402 advances the processing to step S1110.

In step S1110, the power transmission apparatus 402 enables an ending flag for the Negotiation phase.

This processing is able to be implemented by the control unit 101 setting information to a predetermined region of the memory 106. Then, in step S1111, the power transmission apparatus 402 generates a response to the command for notification of ending of the Negotiation phase.

On the other hand, if, in step S1109, it is determined that the received command is not a command for notification of ending of the Negotiation phase (NO in step S1109), then in step S1112, the power transmission apparatus 402 performs processing corresponding to the received command. For example, if the received command is a command concerning GP, the power transmission apparatus 402 determines the value of GP based on, for example, the value of GP which the power reception apparatus 401 requests or the power transmission capability of the power transmission apparatus 402. Moreover, if the received command is FOD Status Packet in which information about Reference Quality Factor Value is stored, the power transmission apparatus 402 adjusts a threshold value in the Q value measuring method and thus determines a final threshold value. Then, in step S1113, the power transmission apparatus 402 generates a response corresponding to the received command.

In step S1104, the power transmission apparatus 402 transmits the generated response to the power reception apparatus 401. Then, in step S1105, the power transmission apparatus 402 determines whether the ending flag for the Negotiation phase is enabled. The determination for the ending flag is able to be implemented by the control unit 101 checking information retained in the memory 106. If it is determined that the ending flag for the Negotiation phase is enabled (YES in step S1105), the power transmission apparatus 402 ends the processing in the present flowchart. On the other hand, if it is determined that the ending flag for the Negotiation phase is disabled (NO in step S1105), the power transmission apparatus 402 returns the processing to step S1101.

Next, processing for requesting foreign object detection by the waveform attenuation method with use of various types of Received Power Packet based on the above-mentioned result of the Negotiation phase is described. The power reception apparatus 401 requests foreign object detection by the waveform attenuation method by appending information about the transmitted electric power control period as arguments of various RP packets (RP0, RP1, and RP2). Thus, the phase in which foreign object detection by the waveform attenuation method is able to be performed is the Calibration phase or the Power Transfer phase, which is capable of transmitting an RP packet.

FIG. 10B is a flowchart illustrating an example of a processing procedure concerning foreign object detection by the waveform attenuation method which is performed by the power reception apparatus 401.

First, in step S1009, the control unit 201 of the power reception apparatus 401 determines whether a condition indicating that a transmitted electric power control maximum period with which the power reception apparatus 401 is compatible is greater than or equal to a transmitted electric power control minimum period which the power transmission apparatus 402 is able to generate is satisfied. This processing is able to be implemented by the control unit 201 checking a transmitted electric power control maximum period included in the response retained in the memory 208 and comparing the transmitted electric power control maximum period with information about a transmitted electric power control maximum period adapted for the power reception apparatus 401 also retained in the memory 208. If it is determined that the condition indicating that the transmitted electric power control maximum period is greater than or equal to a transmitted electric power control minimum period which the power transmission apparatus 402 is able to generate is not satisfied (NO in step S1009), the control unit 201 advances the processing to step S1010. On the other hand, if it is determined that the condition indicating that the transmitted electric power control maximum period is greater than or equal to a transmitted electric power control minimum period which the power transmission apparatus 402 is able to generate is satisfied (YES in step S1009), the control unit 201 advances the processing to step S1011.

In step S1010, the control unit 201 sets the transmitted electric power control period, which is to be set to an RP packet, to "0". This means not to perform foreign object detection by the waveform attenuation method. On the other hand, in step S1011, the control unit 201 sets, as the transmitted electric power control period, a value selected from among usable transmitted electric power control periods, and stores the selected value in the memory 208.

Here, the usable transmitted electric power control periods are, as mentioned above, any values between the transmitted electric power control minimum period, which the power transmission apparatus 402 is able to generate, and the transmitted electric power control maximum period, with which the power reception apparatus 401 is compatible. Furthermore, the selection method for the transmitted electric power control period includes some methods.

As the first method, there is a method of determining the transmitted electric power control period in a single uniform way according to a preliminarily determined rule, such as the maximum value, minimum value, or median value in the obtained selection range. Moreover, as the second method, there is a method of selecting a value calculated based on the degree of dependence of the power reception apparatus 401 on a power reception source determined in view of the operation mode and the power consumption. As mentioned above, in the case of a situation in which the battery 207 is detached and the power reception apparatus 401 is operating with only electric power received by wireless electric power transmission, as small a value as possible is selected as the transmitted electric power control maximum period, and the allowable transmitted electric power control period also necessarily becomes shorter. In a case where, in this way, the power reception apparatus 401 has a high degree of dependence on received electric power, the method selects as small a value as possible as the transmitted electric power control maximum period.

Moreover, in a case where the degree of dependence on received electric power is not so high, such as a case where the battery 207 is attached and the amount of accumulated electric power also has plenty of room, the method selects a large value as the transmitted electric power control maximum period, and is, therefore, able to also select a large value as the transmitted electric power control period. In this way, it is also possible to select a transmitted electric power control period in view of the degree of dependence on received electric power determined in consideration of the operation mode and power consumption of the power reception apparatus 401.

Next, in step S1012, the control unit 201 generates an RP packet having, as an argument, information about the transmitted electric power control period determined in step S1010 or step S1011, and transmits the RP packet to the power transmission apparatus 402. Then, in step S1013, the control unit 201 waits until receiving a response as ACK from the power transmission apparatus 402. Then, in a case where the control unit 201 has not received a response as ACK even after waiting for a predetermined period (NO in step S1013), the control unit 201 returns the processing to step S1012, and thus retransmits the RP packet. Furthermore, in a case where the control unit 201 has received a response as ND (No Decision) described below from the power transmission apparatus 402, the control unit 201 returns the processing to step S1012, and thus retransmits the RP packet.

In a case where the control unit 201 has received a response as ACK from the power transmission apparatus 402 (YES in step S1013), then in step S1014, the control unit 201 performs reception processing for a foreign object detection result notification. Then, in step S1015, based on a result of the foreign object detection result notification, the control unit 201 determines whether a foreign object exists or the probability of a foreign object existing is high. If it is determined that a foreign object exists or the probability of a foreign object existing is high (YES in step S1015), the control unit 201 advances the processing to step S1016, and, if not so (NO in step S1015), the control unit 201 ends the processing in the present flowchart.

In step S1016, the control unit 201 performs predetermined processing accompanied by the existence of a foreign object, and then ends the processing in the present flowchart. Here, the predetermined processing accompanied by the existence of a foreign object includes, for example, a warning to the user or processing for stopping wireless electric power transmission.

FIG. 11B is a flowchart illustrating an example of a processing procedure concerning foreign object detection by the waveform attenuation method which is performed by the power transmission apparatus 402.

First, in step S1114, the control unit 101 included in the power transmission apparatus 402 checks whether information about the transmitted electric power control period is included in the received RP packet. If it is determined that information about the transmitted electric power control period is not included in the received RP packet (NO in step S1114), since foreign object detection by the waveform attenuation method is not requested, the control unit 101 advances the processing to step S1120 described below. On the other hand, if it is determined that information about the transmitted electric power control period is included in the received RP packet (YES in step S1114), the control unit 101 advances the processing to step S1115.

Next, in step S1115, the control unit 101 checks whether the transmitted electric power control period in the received RP packet is "0". If it is determined that the transmitted electric power control period is "0" (YES in step S1115), since this also means not to perform foreign object detection by the waveform attenuation method, the control unit 101 advances the processing to step S1120 described below. On the other hand, if it is determined that the transmitted electric power control period is not "0" (NO in step S1115), the control unit 101 advances the processing to step S1116.

Next, in step S1116, the control unit 101 (the power transmission control unit 302) starts stopping of power transmission for foreign object detection by the waveform attenuation method, according to information about the acquired transmitted electric power control period. Then, in step S1117, the control unit 101 (the foreign object detection unit 305) performs the above-described foreign object detection by the waveform attenuation method.

Subsequently, in step S1118, the control unit 101 determines whether the existence probability of a foreign object has been found out. Here, the method of finding out the existence probability of a foreign object includes some methods. For example, in a case where the power transmission unit 103 has the function of calculating the existence probability of a foreign object based on a result of foreign object detection by the waveform attenuation method, the control unit 101 acquires such information, thus being able to find out the existence probability of a foreign object. In a case where the power transmission unit 103 does not have such function, the control unit 101 can repeat foreign object detection by the waveform attenuation method several times and calculate the existence probability of a foreign object based on a statistical result of the foreign object detection. In this case, the calculation of the existence probability of a foreign object can be implemented by the control unit 101 accumulating results of foreign object detection by the waveform attenuation method in the memory 106 and statistically analyzing the results. However, since, in a case where the repeat number of times of foreign object detection by the waveform attenuation method is small, the existence probability of a foreign object is not found out, the control unit 101 needs to request the power reception apparatus 401 to retransmit an RP packet every time the control unit 101 performs foreign object detection by the waveform attenuation method.

If, in step S1118, it is determined that the existence probability of a foreign object has not been found out (NO in step S1118), then in step S1119, to request the power reception apparatus 401 to retransmit an RP packet, the control unit 101 transmits No Decision (ND) as a response to the power reception apparatus 401. Then, the control unit 101 returns the processing to step S1114, thus waiting for an RP packet to be retransmitted. On the other hand, if, in step S1118, it is determined that the existence probability of a foreign object has been found out (YES in step S1118), the control unit 101 advances the processing to step S1120.

In step S1120, the control unit 101 performs corresponding processing of the RP packet. Then, in step S1121, the control unit 101 transmits ACK as a response to the power reception apparatus 401. Subsequently, in step S1122, the control unit 101 determines whether foreign object detection by the waveform attenuation method has been performed in step S1117. If it is determined that foreign object detection by the waveform attenuation method has not been performed (NO in step S1122), the control unit 101 ends the processing in the present flowchart. On the other hand, if it is determined that foreign object detection by the waveform attenuation method has been performed (YES in step S1122), then in step S1123, the control unit 101 transmits, to the power reception apparatus 401, a foreign object detection result notification including information about, for example, the existence probability of a foreign object, and then ends the processing in the present flowchart.

Thus far is the basic processing which is performed in foreign object detection by the waveform attenuation method. Furthermore, while, in the flowchart of FIG. 10A, the sequential order in which, after transmitting the transmitted electric power control minimum period request command in step S1001, the control unit 201 transmits the transmitted electric power control maximum period notification command in step S1004 has been described, this sequential order can be reversed.

[Exceptional System Processing by Power Reception Apparatus 401 and Power Transmission Apparatus 402]

Next, on the premise that the basic processing for foreign object detection by the waveform attenuation method described with reference to FIG. 10A and FIG. 11A is normal system processing, exceptional system processing in the Negotiation phase in the present example embodiment is described. As mentioned above, in the Negotiation phase, basically, a transmitted electric power control minimum period request command and a transmitted electric power control maximum period notification command are transmitted from a power reception apparatus and, after that, a command for notification of ending of the Negotiation phase is transmitted. On the other hand, in the WPC standard, even if exchange of commands concerning foreign object detection by the waveform attenuation method is not yet completed, the power reception apparatus is able to request ending of the Negotiation phase at optional timing.

Thus, depending on types of a power reception apparatus placed on a power transmission apparatus, there may be a situation in which, for example, before a transmitted electric power control maximum period notification command is transmitted, a command for notification of ending of the Negotiation phase is transmitted. Moreover, in a case where the sequential order of transmission of a transmitted electric power control minimum period request command and a transmitted electric power control maximum period notification command is reversed, there may be a situation in which, before a transmitted electric power control minimum period request command is transmitted, a command for notification of ending of the Negotiation phase is transmitted. In the following description, a processing procedure in such a situation which is performed by the power transmission apparatus 402 and the power reception apparatus 401 in the present example embodiment is described with reference to the flowcharts of FIG. 12 and FIG. 13.

FIG. 13 is a flowchart illustrating an example of a processing procedure which is performed by the power transmission apparatus 402 in the Negotiation phase in the present example embodiment. Furthermore, processing operations illustrated in FIG. 13 are performed by the control unit 101 of the power transmission apparatus 402, and processing operations in steps S1301 to S1309 illustrated in FIG. 13 are similar to those in steps S1101 to S1109 illustrated in FIG. 11A, respectively, and are, therefore, omitted from description.

If, in step S1309, if it is determined that the received command is a command for notification of ending of the Negotiation phase (YES in step S1309), the control unit 101 advances the processing to step S1310. Then, in step S1310, the control unit 101 checks whether exchange of commands required for execution of foreign object detection by the waveform attenuation method is completed. The control unit 101 of the power transmission apparatus 402 previously records a history of exchange of commands required for foreign object detection by the waveform attenuation method on the memory 106, and is thus able to check the presence or absence of any lacking command by checking the history. Furthermore, in the present example embodiment, the commands required for foreign object detection by the waveform attenuation method are a transmitted electric power control minimum period request command and a transmitted electric power control maximum period notification command. If, in step S1310, it is determined that exchange of commands required for execution of foreign object detection by the waveform attenuation method is completed (YES in step S1310), the control unit 101 advances the processing to step S1311. Processing operations in steps S1311 and S1312 are similar to those in steps S1110 and S1111 illustrated in FIG. 11A, respectively.

On the other hand, if, in step S1310, it is determined that exchange of commands required for execution of foreign object detection by the waveform attenuation method is not yet completed (NO in step S1310), the control unit 101 advances the processing to step S1313. Then, in step S1313, the control unit 101 generates a message for requesting an inquiry to the power reception apparatus 401. This message is a message for indicating that the power transmission apparatus 402 intends to communicate with the power reception apparatus 401 at the initiative of the power transmission apparatus 402, and is a message for requesting the power reception apparatus 401 to transmit an inquiry command. Furthermore, this message can be configured to include information indicating that exchange of a transmitted electric power control minimum period request command or a transmitted electric power control maximum period notification command is not yet completed.

On the other hand, if, in step S1309, it is determined that the received command is not a command for notification of ending of the Negotiation phase (NO in step S1309), the control unit 101 advances the processing to step S1314. Then, in step S1314, the control unit 101 determines whether the command received in step S1301 is an inquiry command. If it is determined that the received command is not an inquiry command (NO in step S1314), the control unit 101 advances the processing to step S1316. Processing operations in steps S1316 and S1317 are similar to those in steps S1112 and S1113 illustrated in FIG. 11A, respectively.

On the other hand, if, in step S1314, it is determined that the received command is an inquiry command (YES in step S1314), the control unit 101 advances the processing to step S1315. Then, in step S1315, the control unit 101 generates a message for requesting transmission of a command exchange of which is not yet completed. Specifically, the control unit 101 generates a message for requesting transmission of a transmitted electric power control minimum period request command or a transmitted electric power control maximum period notification command.

Figure 12:
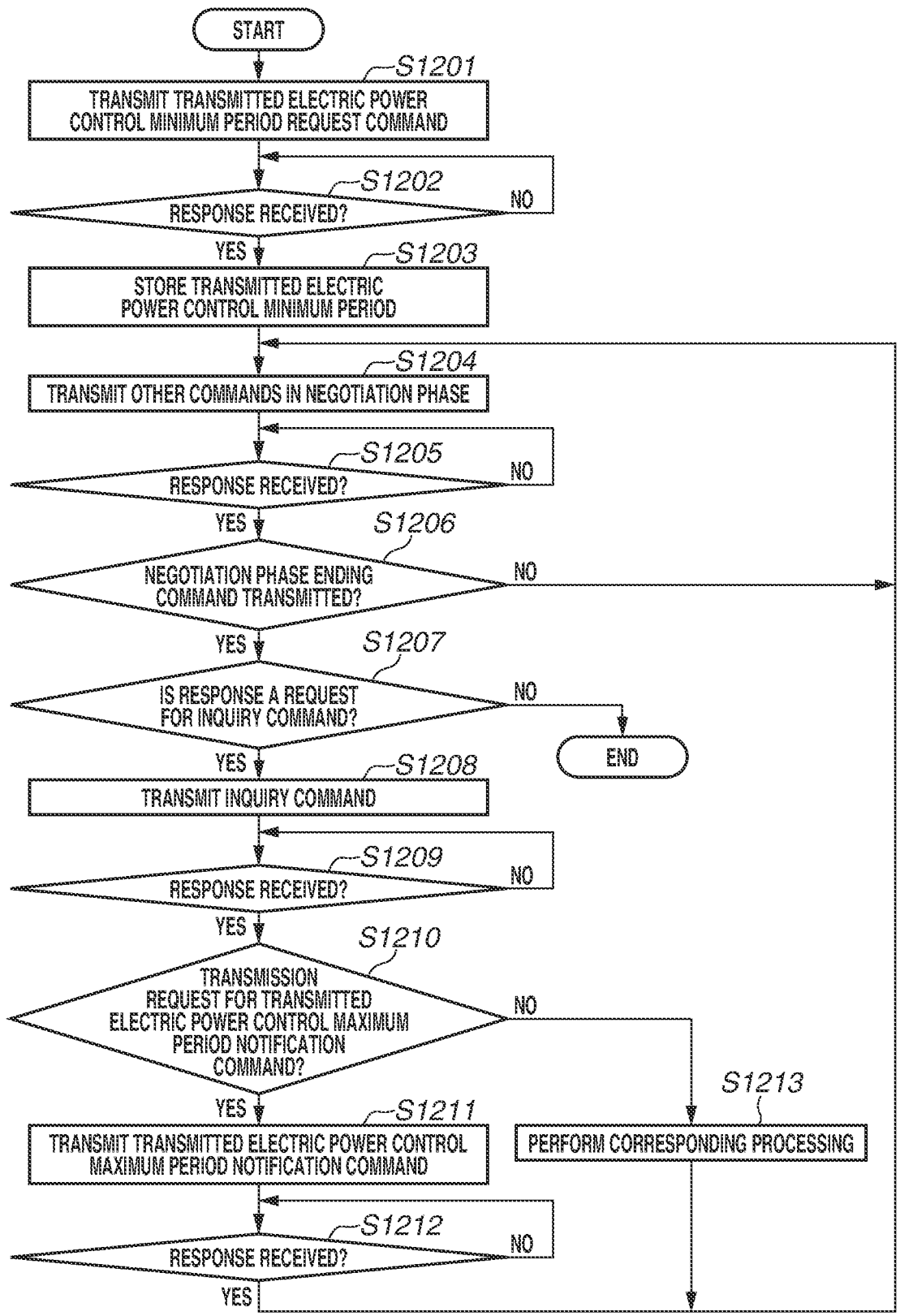
FIG. 12 is a flowchart illustrating an example of an exceptional processing procedure which the power reception apparatus executes in Negotiation phase in the example embodiment.

FIG. 12 is a flowchart illustrating an example of an exceptional processing procedure which the power reception apparatus 401 performs in the Negotiation phase in the present example embodiment. In the following description, an example in which, before transmitting a transmitted electric power control maximum period notification command, the power reception apparatus 401 has transmitted a command for notification of ending of the Negotiation phase is described. Furthermore, processing operations in steps S1201 to S1203 illustrated in FIG. 12 are similar to those in steps S1001 to S1003 illustrated in FIG. 10A, respectively. Moreover, processing operations in steps S1204 to S1206 illustrated in FIG. 12 are similar to those in steps S1006 to S1008 illustrated in FIG. 10A, respectively.

If, in step S1206, it is determined that the command received in step S1204 is a command for notification of ending of the Negotiation phase (YES in step S1206), the control unit 201 advances the processing to step S1207. Then, in step S1207, the control unit 201 checks whether the response received in step S1205 is a message for requesting an inquiry command. If it is determined that the received response is not a message for requesting an inquiry command (NO in step S1207), since the received response is able to be deemed to be a response to the command for notification of ending of the Negotiation phase, the control unit 201 directly ends the Negotiation phase.

On the other hand, if it is determined that the received response is a message for requesting an inquiry command (YES in step S1207), the control unit 201 advances the processing to step S1208. Then, in step S1208, the control unit 201 transmits an inquiry command to the power transmission apparatus 402. This processing is able to be implemented by the control unit 201 writing an inquiry command in the communication unit 204. Then, in step S1209, the control unit 201 waits until receiving a response to the inquiry command.

Upon receiving the response from the power transmission apparatus 402 (YES in step S1209), in step S1210, the control unit 201 checks whether the received response is a message for requesting transmission of a transmitted electric power control maximum period notification command. If it is determined that the received response is a message for requesting transmission of a transmitted electric power control maximum period notification command (YES in step S1210), the control unit 201 advances the processing to step S1211. Processing operations in steps S1211 and S1212 are similar to those in steps S1004 and S1005 illustrated in FIG. 10A. While, upon receiving the response from the power transmission apparatus 402 in step S1212 (YES in step S1212), the control unit 201 returns the processing to step S1204, basically, the control unit 201 is regarded as having responded to an inquiry from the power transmission apparatus 402. Therefore, it is conceivable that, in step S1204, the control unit 201 retransmits a command for notification of ending of the Negotiation phase. On the other hand, if, in step S1210, it is determined that the received response is not a message for requesting transmission of a transmitted electric power control maximum period notification command (NO in step S1210), the control unit 201 advances the processing to step S1213. Then, in step S1213, the control unit 201 performs processing corresponding to the content of the message, and, after that, the control unit 201 returns the processing to step S1204.

FIG. 14 is a flowchart illustrating an example of another exceptional processing procedure which the power reception apparatus 401 performs in the Negotiation phase in the present example embodiment. In the following description, an example in which, before transmitting a transmitted electric power control minimum period request command, the power reception apparatus 401 has transmitted a command for notification of ending of the Negotiation phase is described.

Processing operations in steps S1401 and S1402 illustrated in FIG. 14 are similar to those in steps S1004 and S1005 illustrated in FIG. 10A, respectively. Moreover, processing operations in steps S1403 to S1408 illustrated in FIG. 14 are similar to those in steps S1204 to S1209 illustrated in FIG. 12, respectively.

Upon receiving a response from the power transmission apparatus 402 in step S1408 (YES in step S1408), then in step S1409, the control unit 201 checks whether the received response is a message for requesting transmission of a transmitted electric power control minimum period request command. If it is determined that the received response is a message for requesting transmission of a transmitted electric power control minimum period request command (YES in step S1409), the control unit 201 advances the processing to step S1410. Processing operations in steps S1410 to S1412 are similar to those in steps S1001 to S1003 illustrated in FIG. 10A. While, after, in step S1412, storing information about a transmitted electric power control minimum period which is able to be generated by the power transmission apparatus 402 included in the response, the control unit 201 returns the processing to step S1403, basically, the control unit 201 is regarded as having responded to an inquiry from the power transmission apparatus 402. Therefore, it is conceivable that, in step S1403, the control unit 201 retransmits a command for notification of ending of the Negotiation phase. On the other hand, if, in step S1409, it is determined that the received response is not a message for requesting transmission of a transmitted electric power control minimum period request command (NO in step S1409), the control unit 201 advances the processing to step S1413. Then, in step S1413, the control unit 201 performs processing corresponding to the content of the message, and, after that, the control unit 201 returns the processing to step S1403.

As described above, according to the present example embodiment, it is possible to cope with a case where, before exchange of commands required for execution of foreign object detection by the waveform attenuation method is completed in the Negotiation phase, a command for notification of ending of the Negotiation phase has been transmitted. Specifically, a configuration in which the power transmission apparatus 402 transmits a message for requesting an inquiry and then transmits a message for requesting transmission of a lacking command as a response to the inquiry command is employed. This configuration enables continuing communication even in a case where a command for notification of ending of the Negotiation phase has been transmitted and completing exchange of commands required for execution of foreign object detection by the waveform attenuation method. In this way, in the present example embodiment, it is possible to surely establish an environment capable of correctly determining whether to perform foreign object detection by the waveform attenuation method.

Furthermore, in the example illustrated in FIG. 13, in a case where, before transmitting a transmitted electric power control minimum period request command, the power reception apparatus 401 has transmitted a command for notification of ending of the Negotiation phase, the power transmission apparatus 402 transmits a message for requesting an inquiry. On the other hand, to shorten subsequent processing, instead of a message for requesting an inquiry, the power transmission apparatus 402 can set a transmitted electric power control minimum period which is able to be generated by the power transmission apparatus 402 and then directly transmit a response including such set information. In this case, in step S1313 illustrated in FIG. 13, instead of generating a message for requesting an inquiry, the power transmission apparatus 402 performs processing similar to that in step S1303 and enables an ending flag for the Negotiation phase. Moreover, the power reception apparatus 401 regards a response including information about a transmitted electric power control minimum period transmitted from the power transmission apparatus 402 as a response to the command for notification of ending of the Negotiation phase. Then, the control unit 201 stores the information about a transmitted electric power control minimum period and then ends the processing illustrated in FIG. 14.

Moreover, in a case where a command for notification of ending of the Negotiation phase has been transmitted with neither a transmitted electric power control minimum period request command nor a transmitted electric power control maximum period notification command being transmitted from the power reception apparatus 401, basically, the power transmission apparatus 402 is also regarded as performing a processing procedure illustrated in FIG. 13. Even in this case, the power transmission apparatus 402 generates a message for requesting transmission of both a transmitted electric power control minimum period request command and a transmitted electric power control maximum period notification command with respect to an inquiry command issued one time.

Moreover, in a description that is based on the processing procedure illustrated in FIG. 14, first, the power reception apparatus 401 starts processing with step S1403. Then, after storing the transmitted electric power control maximum period in step S1412, the reception apparatus 401 performs processing operations in steps S1401 and S1402 and then returns the processing to step S1403.

Moreover, in the present example embodiment, a communication in the Negotiation phase is continued by the power transmission apparatus 402 transmitting a message for requesting an inquiry. However, depending a type of power reception apparatus, there is also a case where the power reception apparatus transmits a command for notification of ending of the Negotiation phase with the intention in a situation in which one of the commands is not yet executed. Such a power reception apparatus may deny continuation of a communication even if the power transmission apparatus 402 transmits a message for requesting an inquiry and may retransmit a command for notification of ending of the Negotiation phase. As a result, a situation occurs in which exchange of a command for notification of ending of the Negotiation phase and a message for requesting an inquiry is repeated and thus endlessly does not end.

Therefore, to address such a situation, in step S1313, the control unit 101 of the power transmission apparatus 402 can record, on the memory 106, the number of times for which the control unit 101 has generated a message for requesting an inquiry. Then, after the number of times for which the control unit 101 has generated a message for requesting an inquiry reaches a predetermined number of times, the control unit 101 forcibly enables an ending flag for the Negotiation phase. This enables preventing exchange of a command for notification of ending of the Negotiation phase and a message for requesting an inquiry from endlessly continuing.

In the above-described example embodiment, the power transmission apparatus 402 performs transmitted electric power control and performs foreign object detection based on waveform attenuation index obtained by such control. As another method of measuring a Q value serving as one of waveform attenuation indices, there is also a method of measuring a Q value by transmitting a signal having a plurality of frequency components (for example, pulse waves), measuring, for example, the amplitude or attenuation state of their waveforms, and performs computation processing (for example, Fourier transform) on the result of measurement. This method can also be applied to the above-described example embodiment.

Various embodiments of the present disclosure can also be implemented by performing processing for supplying a program which implements one or more functions of the above-described example embodiment to a system or apparatus via a network or a storage medium and causing one or more processors included in a computer of the system or apparatus to read out and execute the program. Moreover, various embodiments of the present disclosure can also be implemented by a circuit which implements such one or more functions (for example, an application specific integrated circuit (ASIC)).

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While t example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2022-014181 filed Feb. 1, 2022, which is hereby incorporated by reference herein in its entirety.

What is claimed is:
1. A power transmission apparatus comprising:
a power transmission unit configured to wirelessly transmit power to a power reception apparatus;

a detection unit configured to detect whether a foreign object exists;

a communication unit configured to perform a communication with the power reception apparatus of information used for performing detection by the detection unit; and a request unit configured to make a request to the power reception apparatus for continuing the communication of information in a case where ending of the communication of information is requested from the power reception apparatus before the communication of information used for performing detection by the detection unit ends, wherein the request unit makes a transmission request for an inquiry command as the request for continuing the communication of information, and wherein the communication unit transmits, to the power reception apparatus, a transmission request for information lacking for performing detection by the detection unit, as a response to the inquiry command.

2. The power transmission apparatus according to claim 1, wherein the detection unit detects whether a foreign exists, based on a quality value which is measured in a period in which transmitted power is limited, and wherein, in a case where, before a command for requesting a minimum value of the period in which transmitted power is limited is received from the power reception apparatus, ending of the communication of information is requested from the power reception apparatus, the communication unit transmits, to the power reception apparatus, a transmission request for a command for requesting a minimum value of the period in which transmitted power is limited, as a response to the inquiry command.

3. The power transmission apparatus according to claim 1, wherein the detection unit detects whether a foreign object exists, based on a quality value which is measured in a period in which transmitted electric power is limited, and wherein, in a case where, before a command for notification of a maximum value of the period in which transmitted electric power is limited is received from the power reception apparatus, ending of the communication of information is requested from the power reception apparatus, the communication unit transmits, to the power reception apparatus, a transmission request for a command for notification of a maximum value of the period in which transmitted electric power is limited, as a response to the inquiry command.

4. The A power transmission apparatus comprising:

a power transmission unit configured to wirelessly transmit power to a power reception apparatus;

a detection unit configured to detect whether a foreign object exists;

a communication unit configured to perform a communication with the power reception apparatus of information used for performing detection by the detection unit; and a request unit configured to make a request to the power reception apparatus for continuing the communication of information in a case where ending of the communication of information is requested from the power reception apparatus before the communication of information used for performing detection by the detection unit ends, wherein, in a case where a number of times for which the request unit has made a request to the power reception apparatus for continuing the communication of information has reached a predetermined number of times, the communication unit transmits, to the power reception apparatus, a response indicating acceptance of a request for ending of the communication of information received from the power reception apparatus.

5. The power transmission apparatus according to claim 1, further comprising wheels and a battery, wherein the power transmission apparatus performs wireless power transmission to the power reception apparatus with use of power stored in the battery.

6. The power transmission apparatus according to claim 1, wherein the power transmission apparatus is installed in a vehicle.

7. A power transmission apparatus comprising:

a power transmission unit configured to wirelessly transmit power to a power reception apparatus; a detection unit configured to detect whether a foreign object exists, based on a quality value which is measured in a period in which transmitted electric power is limited; and a communication unit configured to perform a communication of information used for performing detection by the detection unit with the power reception apparatus, wherein, in a case where, ending of the communication of information is requested from the power reception apparatus before a command for requesting a minimum value of the period in which transmitted power is limited is received from the power reception apparatus, the communication unit transmits, to the power reception apparatus, information about a minimum value of the period in which transmitted power is limited, as a response to a request for ending of the communication of information.

8. The power transmission apparatus according to claim 7, further comprising wheels and a battery, wherein the power transmission apparatus performs wireless power transmission to the power reception apparatus with use of power stored in the battery.

9. The power transmission apparatus according to claim 7, wherein the power transmission apparatus is installed in a vehicle.

10. A method for a power transmission apparatus, the method comprising:

detecting whether a foreign object exists;

performing a communication with the power reception apparatus of information used for performing the detection;

making a request to the power reception apparatus for continuing the communication of information in a case where ending of the communication of information is requested from the power reception apparatus before the communication of information used for performing the detection ends, wherein a transmission request for an inquiry command is made as the request for continuing the communication of information;

receiving the inquiry command; and transmitting, to the power reception apparatus, a transmission request for information lacking for performing detection in the detecting, as a response to the inquiry command.

11. A method for a power transmission apparatus, the method comprising:

detecting whether a foreign object exists, based on a quality value which is measured in a period in which transmitted power is limited; and performing a communication of information used for performing the detection with the power reception apparatus, wherein, in a case where ending of the communication of information is requested from the power reception apparatus before a command for requesting a minimum value of the period in which transmitted power is limited is received from the power reception apparatus, in the communication, information about a minimum value of the period in which transmitted power is limited is transmitted to the power reception apparatus as a response to a request for ending of the communication of information.

12. A non-transitory computer-readable storage medium storing computer-executable instructions that, when executed by a computer, cause the computer to perform a method for a power transmission apparatus, the method comprising:

detecting whether a foreign object exists;

performing a communication with the power reception apparatus of information used for performing the detection;

making a request to the power reception apparatus for continuing the communication of information in a case where ending of the communication of information is requested from the power reception apparatus before the communication of information used for performing the detection ends, wherein a transmission request for an inquiry command is made as the request for continuing the communication of information;

receiving the inquiry command; and transmitting, to the power reception apparatus, a transmission request for information lacking for performing detection in the detecting, as a response to the inquiry command.

13. A non-transitory computer-readable storage medium storing computer-executable instructions that, when executed by a computer, cause the computer to perform a method for a power transmission apparatus, the method comprising:

detecting whether a foreign object exists, based on a quality value which is measured in a period in which transmitted power is limited; and performing a communication of information used for performing the detection with the power reception apparatus, wherein, in a case where ending of the communication of information is requested from the power reception apparatus before a command for requesting a minimum value of the period in which transmitted power is limited is received from the power reception apparatus, in the communication, information about a minimum value of the period in which transmitted power is limited is transmitted to the power reception apparatus as a response to a request for ending of the communication of information.

* * * * *